(12) United States Patent
Lagrange et al.

(10) Patent No.: US 9,071,768 B2
(45) Date of Patent: Jun. 30, 2015

(54) METHOD OF TRANSMITTING VIDEO INFORMATION OVER A WIRELESS MULTI-PATH COMMUNICATION LINK AND CORRESPONDING WIRELESS STATION

(71) Applicant: CANON KABUSHIKI KAISHA, Tokyo (JP)

(72) Inventors: Pascal Lagrange, La Chapelle des Fougeretz (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 13/717,236

(22) Filed: Dec. 17, 2012

(65) Prior Publication Data

US 2013/0156109 A1 Jun. 20, 2013

(30) Foreign Application Priority Data

Dec. 19, 2011 (GB) .................................. 1121821.1

(51) Int. Cl.
*H04N 21/63* (2011.01)
*H04N 19/00* (2014.01)
*H04N 19/66* (2014.01)

(52) U.S. Cl.
CPC ......... *H04N 7/26877* (2013.01); *H04N 21/631* (2013.01); *H04N 19/66* (2014.11)

(58) Field of Classification Search
USPC .................. 370/477, 535–544; 375/144, 148, 375/240.21, 349
See application file for complete search history.

(56) References Cited

U.S. PATENT DOCUMENTS

| 2002/0186765 | A1 | 12/2002 | Morley et al. |
| 2003/0026477 | A1 | 2/2003 | Ishiga |
| 2012/0076204 | A1* | 3/2012 | Raveendran et al. .... 375/240.12 |
| 2012/0170523 | A1* | 7/2012 | Civanlar ....................... 370/329 |

OTHER PUBLICATIONS

Zhou et al., Multi-path Transport of FGS Video, Mar. 2003, Mitsubishi Electric Research Laboratories, 15 pages.*
Jiang, et al., "Multiple Description Coding via Polyphase Transform and Selective Quantization", Proc. SPIE 3653, Visual Communications and Image Processing '99, 998 (Dec. 28, 1998).

* cited by examiner

*Primary Examiner* — Hoon J Chung
(74) *Attorney, Agent, or Firm* — Canon U.S.A., Inc. IP Division

(57) ABSTRACT

The present invention a method of transmitting video information over a communication link made of several transmission paths between wireless transmitting and receiving stations. The method comprises, in the wireless transmitting station, obtaining an uncompressed video frame made of an array of pixel blocks, a pixel in the pixel blocks being represented by base pixel information and enhancement pixel information; generating at least one set of complementary pixel blocks from a given pixel block of the obtained uncompressed video frame, by applying different operations to said given pixel block for dropping different enhancement pixel information from that pixel block, so that the complementary pixel blocks comprise different enhancement pixel information and each comprises the base pixel information; and for each set, transmitting the complementary pixel blocks over respective different transmission paths to the wireless receiving station. This provides robustness of video transmission while keeping a high quality of video rendering.

19 Claims, 8 Drawing Sheets

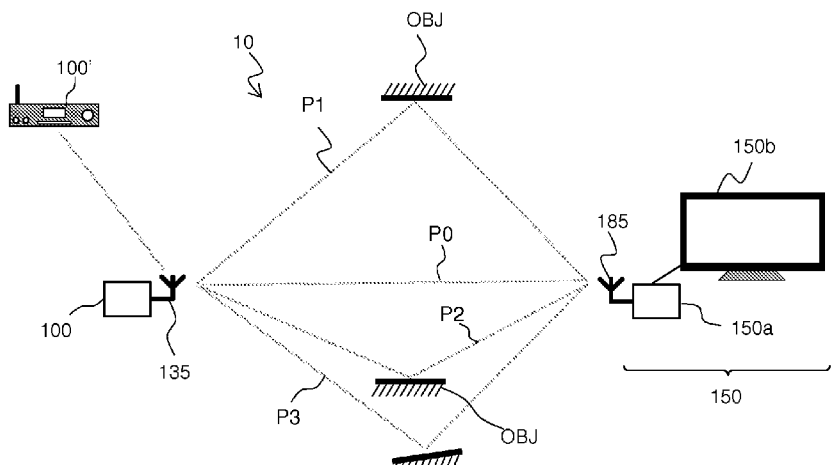
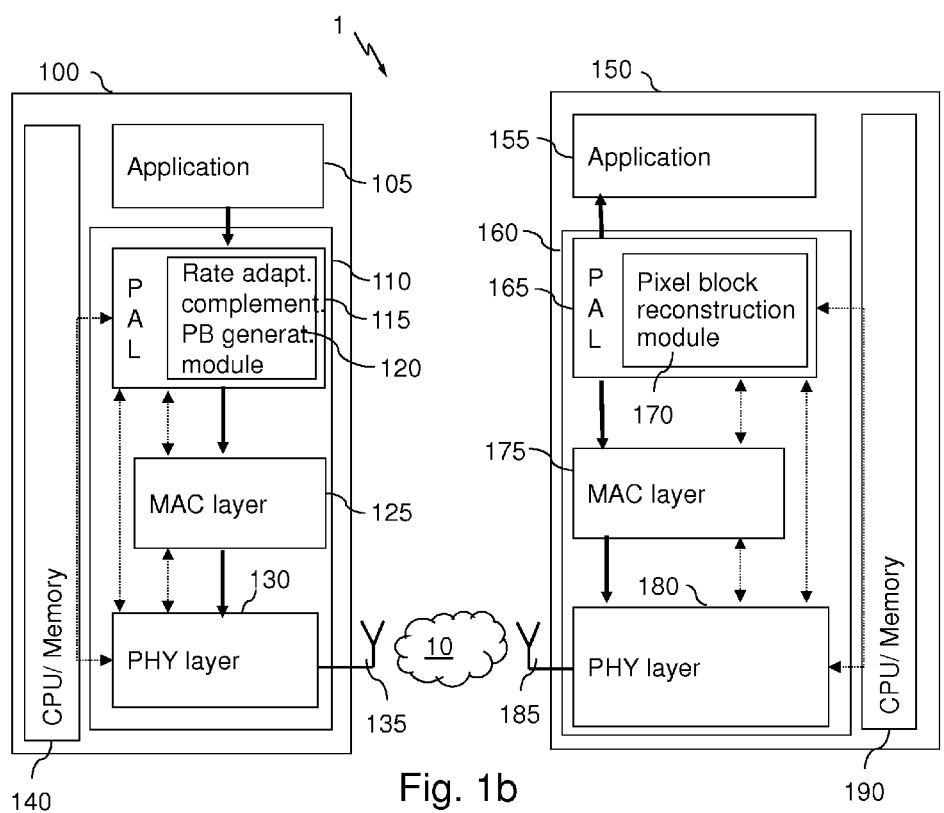
Fig. 1a
Fig. 1b

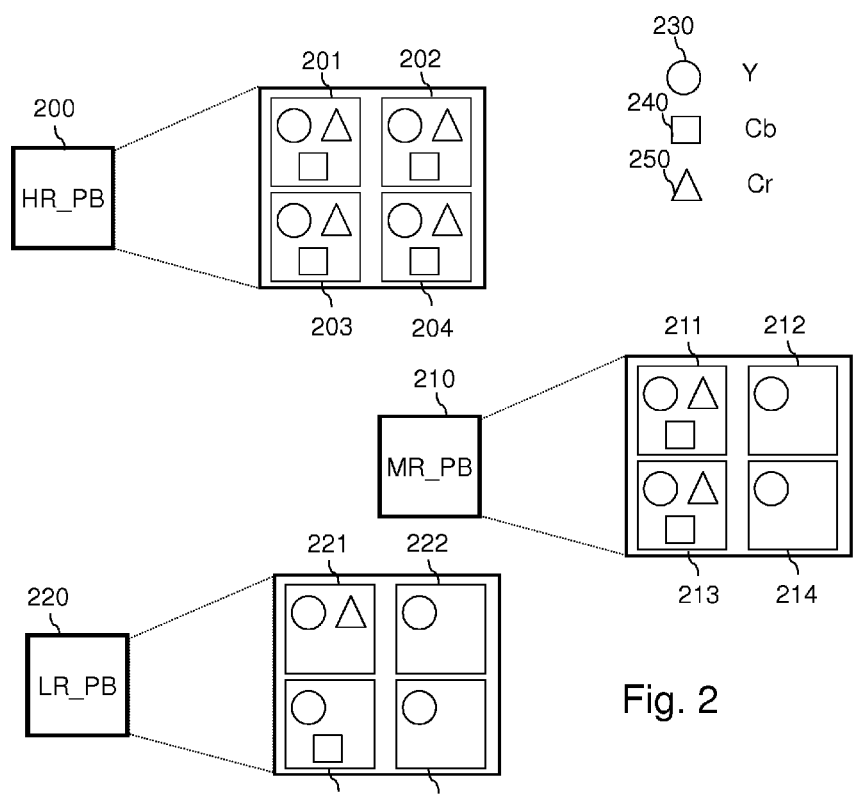
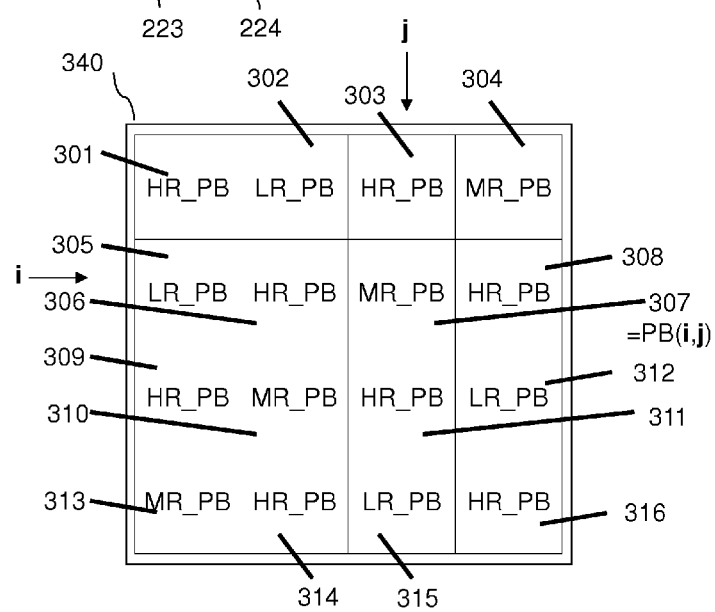
Fig. 2
Fig. 3

H = HR_PB
M1 = MR_PB Type 1
M2 = MR_PB Type 2
L = LR_PB

METHOD OF TRANSMITTING VIDEO INFORMATION OVER A WIRELESS MULTI-PATH COMMUNICATION LINK AND CORRESPONDING WIRELESS STATION

This application claims priority from GB patent application No. 11 21821.1 of Dec. 19, 2011 which is incorporated herein by reference.

FIELD OF THE INVENTION

The present invention relates in general to wireless communication, and in particular, to processing uncompressed video streams for wireless communication over multiple transmission paths.

BACKGROUND OF THE INVENTION

New recent multimedia applications, such as high-definition audio/video streaming, require wireless transmission of uncompressed video at high data rate of about several Gbps (Gigabits per second), with low latency.

High definition (HD) video generally refers to a sequence of 60 Hz video frames with 1920 vertical lines and 1080 horizontal lines corresponding to 1920×1080 pixels of 24 bits. A video wireless communication system that supports such HD video requires a channel or communication link bandwidth of about 3 Gbps to support video data only.

Such rate is not achievable in current 802.11 wireless communication systems using the 2.4 GHz and 5 GHz radio bands. To overcome the limits of these radio bands, higher frequencies, for instance the 57-66 GHz millimeter-wave unlicensed spectrum, referred to as 60 GHz millimeter wave technology, are used.

60 GHz-based communication systems are widely studied (e.g. IEEE 802.11 Task Group; IEEE 802.15.3c standard; Wireless HD; WiGiG; etc.) and the research community proposes several solutions and methods to transport the audio and video applications with a desired quality of service (QoS).

In the wireless communication systems, before a video stream is transmitted, connection setup and communication link bandwidth reservation are conducted. Ideally, sufficient link bandwidth can be allocated and the video stream can be transmitted smoothly after stream set-up control.

However, the 60 GHz millimeter wave technology is highly sensitive to perturbations (shadowing or interference) or fading phenomena making the quality of the wireless link dynamically change over time. For example, for 60 GHz wireless channels with beam-formed transmissions, the communication link can be affected even by a person moving which appears as an unexpected obstacle on a transmission path. In these cases, the degradation of the communication link requires for example changing the channel coding (for instance by increasing the redundancy data) or/and the type of modulation of video data. This results in the initial allocated link bandwidth being no longer sufficient for video transmission.

Spatial diversity is a well-known approach that improves the quality and reliability of a wireless link, and thus brings robustness when communicating information on a wireless communication link. Spatial diversity is achieved by utilizing a plurality of transmission paths for transmitting the same information in a wireless communication system between two communicating stations. Alternative transmission paths may result for example from the use of several antennas or from the reflection of the data signal on various objects.

In practice, if a transmission of information fails through one transmission path due to the presence of an unexpected obstacle for example, the same information is still likely to reach the intended wireless receiving station through an alternative transmission path.

However, the spatial diversity requires duplicating the same information on a plurality of transmission paths, thus consuming communication network bandwidth and limiting the useful bandwidth allocated to the source data.

Therefore, using spatial diversity for conveying video stream between a wireless transmitting station (source device) and a wireless receiving station (destination device) would result in decreasing the video stream resolution so that it fits with the available link bandwidth, thereby reducing the quality of video rendering.

One well-known approach to decrease the video stream resolution is based on performing a video component removing or dropping operation, referred herein to as "sub-sampling".

Sub-sampling generally consists in dropping some colour information or components, such as chroma components, from the original video pixels, so as to decrease the amount of pixel information without significant visual or rendering degradation. This may be acceptable because the human vision system is less sensitive to colour (chroma components) than brightness (luma component).

In other words, the colour information of the video frames is sampled at a lower resolution.

Three main pixel information dropping profiles for sub-sampling are commonly used in video compression standards: 4:4:4, 4:2:2 and 4:2:0 corresponding respectively to a reduction of the video data of 0%, 33% and 50%. The selected profile is usually applied to the whole video frame.

However, the number of sub-sampling profiles is very small and the reduction between two levels is very high. This is not suitable to optimize the use of the available link bandwidth over the multiple transmission paths, while keeping the best high quality video rendering.

An example is given to illustrate this assertion: if a node of the wireless communication network needs to reduce the video rate by about 10% (i.e. of the useful video data), the second profile or level (i.e. 4:2:2) has to be used. This use results in a video rate reduction of 33% whereas only a reduction of 10% would be necessary. Since more video components than necessary are then removed or dropped from the original video stream, the rendering of the video is severely decreased in quality.

Another approach to achieve robust communication over unreliable communication channels such as in a lossy packet network is disclosed through the publication "*Multiple Description Coding via Polyphase Transform and Selective Quantization*" by W. Jiang and A. Ortega.

Data from a video source is first decomposed into two sub-sources via a polyphase transform. Each of these two sub-sources is quantized independently according to a first quantization scheme so as to provide the primary part of information of each of two communication channels. For reconstruction of the other channel in case of loss of one channel, each channel also carries information about the other channel: a coarsely quantized version of the other sub-source that is generated based on a second quantization scheme.

The quantized output from the first and second quantization schemes are multiplexed together for transmission over each communication channel. At the receiving station, if data from both channels arrives, fine quantized data of both polyphase components is then used for reconstruction of the original video source data.

Otherwise, if data from one channel is lost, one fine quantized polyphase and one coarsely quantized polyphase component are used for reconstruction of the best possible version of the original video source data.

Such a polyphase and quantization-based approach appears to be resource-demanding for the transmitting and receiving stations.

SUMMARY OF THE INVENTION

The present invention has been devised to address at least the foregoing concern, in particular to optimize the bandwidth usage while keeping robustness when transmitting video data in a spatial-diversity-based wireless communication system.

In this context, according to a first aspect of the invention, there is provided a method of transmitting video information over a wireless communication link made of several transmission paths between a wireless transmitting station and a wireless receiving station, the method comprising, in the wireless transmitting station:

obtaining an uncompressed video frame made of an array of pixel blocks, a pixel in the pixel blocks being represented by base pixel information and enhancement pixel information;

generating at least one set of complementary pixel blocks from a given pixel block of the obtained uncompressed video frame, by applying different operations to said given pixel block for dropping different enhancement pixel information from that pixel block, so that the complementary pixel blocks comprise different enhancement pixel information and each comprises the base pixel information; and for each set, transmitting the complementary pixel blocks over respective different transmission paths to the wireless receiving station.

As known by one skilled in the art, the base pixel information provides base information for rendering the corresponding pixel (i.e. most significant pixel information representing the pixel), while the enhancement pixel information provides additional information for gradually improving the pixel rendering from the base information (i.e. least significant pixel information). As illustrated below, this may be for example a base luma component versus enhancement chroma components.

Complementary pixel blocks are blocks of pixels that, when combined, make it possible to retrieve a pixel block having more original pixel information than when considering each complementary pixel block independently from the other. In particular, the different enhancement pixel information dropping operations applied to a given pixel block may be defined so that a combination of the resulting complementary pixel blocks provides all the pixel information of said given pixel block. The number of complementary pixel blocks generated from the same uncompressed pixel block is not limited by the invention. However a preferred embodiment considers a pair of complementary pixel blocks only.

The present invention provides robustness of video transmission while keeping a high quality of video rendering.

This is achieved by providing a set of compressed pixel blocks that may be independently decoded to render the corresponding pixel block, given the fact that each of them comprises the original base pixel information. This ensures robust transmission of the video data, since the independently-decodable compressed pixel blocks are transmitted over different transmission paths. In other words, the wireless receiving station may decode the received compressed pixel blocks regardless of the actual transmission paths from which they are received.

This is also achieved by providing a set of compressed pixel blocks that are complementary in such a way that their combination at the wireless receiving station offers high resolution pixel rendering, and thus a high rendering quality.

Furthermore, the pixel information dropping operations used by the invention can easily be performed "on-the-fly" by a low-complexity hardware implementation, i.e. with very low memory requirement for the wireless transmitting station.

According to a second aspect of the invention, there is provided a wireless station for transmitting video information to a wireless receiving station over a wireless communication link made of several transmission paths, the wireless transmitting station comprising:

an obtaining means for obtaining an uncompressed video frame made of an array of pixel blocks, a pixel in the pixel blocks being represented by base pixel information and enhancement pixel information;

a complementary pixel block generator for generating at least one set of complementary pixel blocks from a given pixel block of the obtained uncompressed video frame, by applying different operations to said given pixel block for dropping different enhancement pixel information from that pixel block, so that the complementary pixel blocks comprise different enhancement pixel information and each comprises the base pixel information; and a communication module for transmitting, for each set, the complementary pixel blocks over respective different transmission paths to the wireless receiving station.

According to a third aspect of the invention, there is provided a wireless communication system, comprising a wireless transmitting station as defined above and a wireless receiving station, wherein the wireless receiving station comprises:

a communication module for receiving the transmitted pixel blocks over different transmission paths; and a pixel block reconstruction module for combining the received pixel blocks to generate a reconstructed pixel block which is enhanced compared to each of the received pixel blocks.

Optional features of the invention are further defined in the dependent appended claims.

For example, each generated set is a pair of generated complementary pixel blocks and said transmitting comprising transmitting one complementary pixel block of each pair over a first transmission path to the wireless receiving device and the other complementary pixel block of each pair over a second separate transmission path to the wireless receiving device. Generating pairs is a good trade-off between the use of the bandwidth and transmission robustness in most wireless communication situations. Of course, triplets (or more) of complementary pixel blocks may be alternatively generated in some situations of higher perturbation, at the extra cost of transmitting the base pixel information more times.

In one embodiment of the invention, at least two sets of complementary pixel blocks are generated from respective pixel blocks of the obtained uncompressed video frame, and the complementary pixel blocks from the two sets which are transmitted over the same transmission path are generated by applying two different enhancement pixel information dropping operations.

This provision thus generates a rate-reduced video frame (or sequence or stream of compressed frames) that better fits with changing available bandwidth of the communication link or transmission paths. This is done by allowing the application of two different enhancement pixel information dropping operations to two pixel blocks within the same video frame, thus enabling switching between two enhancement pixel information dropping operations to be performed during the processing of the same video frame, in case the available link or path bandwidth changes.

Since the video stream is closely adapted to the changing available link or path bandwidth, the rendering quality is improved and optimized.

According to a particular feature of the invention, the method further comprises selecting the different enhancement pixel information dropping operations to apply based on one or more network conditions of the wireless communication link. For example, a network condition may be the available bandwidth of the communication link or of the transmission path.

This provision enables the video stream to be dynamically rate-adapted as the network conditions change, even during the processing of the same video frame. Dynamically adapting the rate may here be performed by switching from first dropping operations to apply to a first pixel block to other dropping operations to apply to a second pixel block.

In a first particular embodiment of the invention, the pixel information defining a pixel comprises a base colour component and at least one enhancement colour component, and an enhancement pixel information dropping operation applied to a given pixel block drops an enhancement colour component of at least one pixel of that given pixel block. In particular, the base colour component may be a luma component and the dropped colour component may be a chroma component, in a luma-chroma based colour space. This is because the chroma components are less significant than the luma component (in a Y-Cr-Cb space) in the video frame rendering. This limits the degradation of the rendering quality.

As an example of implementation, the different pixel information dropping operations applied to the same four-pixel block may comprise:

a sub-sampling operation applied to the four-pixel block according to a 4:2:2 scheme that drops the chroma colour components from two out of the four pixels, and a sub-sampling operation applied to the four-pixel block according to a 4:2:2 scheme that drops the chroma colour components from the other two pixels; or a sub-sampling operation applied to the four-pixel block according to a 4:2:0 or 4:1:1 scheme that drops chroma colour components from all the four pixels, and a sampling operation applied to the four-pixel block according to a 4:4:4 scheme that keeps all the colour components of the pixel block.

These sub-sampling schemes only require very limited hardware resources to be implemented, in particular memory resources. A low-complexity multi-path transmission scheme between the wireless transmitting and receiving stations is thus provided.

According to a particular feature, the pixel information defining a pixel comprises (e.g. colour) components coded over a fixed number of bits, and the different enhancement pixel information dropping operations applied to the same pixel block further drop least significant bits (known as LSB) of (colour) pixel components within the pixel block. This may also include dropping LSBs from base pixel information such as a luma component.

This aims at further reducing the rate of the resulting video frame. For example the two LSBs may be dropped from some or all pixel components, in which case the wireless receiving station may recover the original dropped LSB from another transmission path or by using padding bits.

In particular, the different enhancement pixel information dropping operations applied to the same pixel block drop the least significant bits of different pixel (colour) components within the pixel block. This optimizes the use of the bandwidth (by reducing the number of bits to be transmitted) while keeping a high rendering quality (by selecting different dropped bits for the transmitted complementary pixel blocks). More significant pixel components may have less LSBs dropped.

Of course, improvement of that optimization may be obtained when applying to the complementary pixel blocks respective LSB dropping operations that are complementary, so that a combination of the resulting complementary pixel blocks provides the original LSB of all pixels within the pixel block. The complementary LSB dropping for a pair of complementary pixel blocks may mean that when a pixel component of a complementary pixel block has some LSBs dropped, the same pixel component of the other complementary pixel block has those bits kept.

In a second particular embodiment of the invention, the base pixel information defining a pixel is made of at least one most significant bit of at least one colour component and the enhancement pixel information is made of least significant bits of the at least one colour component, and the different enhancement pixel information dropping operations applied to the same pixel block drop different least significant bits of the at least one colour pixel component within the pixel block.

This variant, which may also be combined with the above first particular embodiment, may be used to provide several intermediate levels of rate reduction for each transmission path, depending on the number of removed/dropped bits per pixel component. Of course, for the same pixel, it is possible to drop a different number of least significant bits from one colour component to the other.

According to a particular feature of the invention, the enhancement pixel information dropping operations applied to a plurality of pixel blocks to generate the complementary pixel blocks to be transmitted over the same transmission path are defined in a pixel information dropping profile selected from a first set of (e.g. eight) predetermined dropping profiles. A profile may for example define which colour components of which pixels have to be dropped within the pixel blocks to which the profile is applied. Examples of profiles are described in detail through the specification below.

This provision provides several intermediate levels of rate reduction compared to 4:4:4, 4:2:2 and 4:2:0 full-frame profiles, since each dropping profile may drop more or less colour components from the considered pixel blocks. Thanks to a large number of intermediate rate reduction levels, the video rate may fit better with the available link or path bandwidth.

Eight predetermined dropping profiles appear to be a good trade-off between the number of intermediate rate reduction levels and the possible costs for indicating the used dropping profile to a station receiving the resulting rate-reduced video stream.

This results in the corresponding system comprising a plurality of different enhancement pixel information dropping profiles, wherein an enhancement pixel information dropping profile defines a pattern of different sub-sampling operations to apply to a corresponding plurality of pixel blocks to generate the complementary pixel blocks to be transmitted over the same transmission path. Of course, the sub-sampling operations may if desired refer to the 4:2:2 and 4:2:0 sub-sampling schemes.

One may thus easily understand that a first dropping profile may be used to generate (from a plurality of uncompressed pixel blocks) the complementary pixel blocks for a first transmission path, a second complementary dropping profile may be used to generate the complementary pixel blocks for a second transmission path from the same plurality of uncompressed pixel blocks, and so on.

According to a particular feature of the invention, the method comprises applying an enhancement pixel information dropping operation to a given pixel block to obtain a complementary pixel block to be transmitted over a transmission path; and applying, to at least one adjacent pixel block (and usually several adjacent pixel blocks, for example the four surrounding pixel blocks) adjacent to the given pixel block, an enhancement pixel information dropping operation that keeps more enhancement pixel information than the enhancement pixel information dropping operation applied to the given pixel block, to obtain an adjacent complementary pixel block to be transmitted over the same transmission path. This scheme of dropping operations applied to five adjacent pixel blocks may be specified within the above defined enhancement pixel information dropping profile.

An efficient reconstruction at the wireless receiving station may thus advantageously be performed. This is because the dropped enhancement pixel information can be reconstructed or recovered from the adjacent pixels, thus reducing the pixel reconstruction errors.

According to another particular feature of the invention, the method further comprises, in the wireless receiving station:

receiving the transmitted pixel blocks over different transmission paths; and combining the received pixel blocks to generate a reconstructed pixel block which is enhanced compared to each of the received pixel blocks.

Such reconstruction at the receiving station makes it possible to optimize the rendering quality of the video frame on reception of several complementary pixel blocks through the alternative transmission paths of the wireless communication link.

In particular, combining the received pixel blocks generates an enhanced pixel block having all the pixel information of the corresponding pixel block within the uncompressed video frame. This situation is achieved when the complementary pixel blocks generated by the transmitting station are fully complementary (i.e. together comprise all the original uncompressed pixel information) and all the complementary pixel blocks are received and combined by the wireless receiving station. This provides the best rendering quality, without pixel information loss.

Another aspect of the invention relates to a computer program product for a programmable apparatus, the computer program product comprising a sequence of instructions for carrying out the method as set out above when loaded into and executed by the programmable apparatus.

Yet another aspect of the invention relates to a non-transitory computer-readable storage medium, able to be read by a programmable apparatus, storing instructions of a computer program for carrying out the method as set out above when loaded into and executed by the programmable apparatus.

The computer program product and the computer-readable storage medium may have features and advantages that are analogous to those set out above and below in relation to the methods of transmitting video information, in particular that of providing transmission robustness while keeping a high quality of video rendering.

Another aspect of the invention relates to a method of transmitting video information substantially as herein described with reference to, and as shown in, FIG. 10; FIGS. 10 and 6; FIGS. 10 and 7; FIGS. 10 and 8; FIGS. 10 and 9; FIGS. 6, 7, 8, 9 and 10; FIGS. 10 and 11 of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1a illustrates multi-path communication in a wireless communication network;

FIG. 1b illustrates, using functional blocks, a wireless communication system implementing the invention;

FIG. 2 illustrates a high resolution pixel block, a medium resolution pixel block and a low resolution pixel block according to a first embodiment of the invention, based on chroma-component dropping approach;

FIG. 3 represents an exemplary Macro Pixel Block implemented in the first embodiment of the present invention;

DETAILED DESCRIPTION OF EMBODIMENTS OF THE INVENTION

Figures 4, 6:
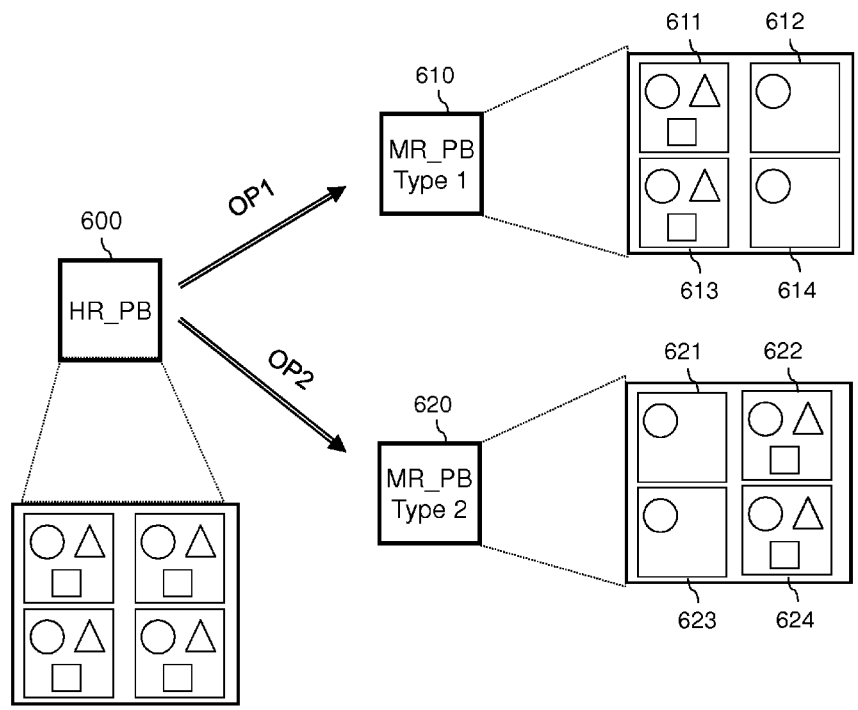
FIG. 4 illustrates a plurality of enhancement pixel information dropping profiles according to an embodiment of the invention.
FIG. 6 illustrates complementary enhancement pixel information dropping operations applied to the same pixel block according to the invention.

The invention provides methods and systems of transmitting video information such as video frames, in particular processed from uncompressed video streams.

As illustrated below, the invention may come within the scope of transmission data rate adaptation for uncompressed video communication in wireless multi-path communication systems. The video frames comprise pixels of video information. Video information is transmitted over a wireless communication link from a wireless transmitting station to a wireless receiving station, using multiple transmission paths.

FIG. 1a depicts, for illustrative purpose, a wireless communication network 10 based on multiple transmission paths between communicating stations, also known as "spatial diversity". Typically, the wireless communication network 10 operates in the unlicensed 60 GHz frequency band (millimeter waves) to provide enough bandwidth capacity to support the transmission of HD video content.

The wireless communication network 10 comprises a first wireless communicating node 100 and a second wireless communicating node 150.

In this particular example, the second wireless communicating node 150 comprises a wireless communicating station 150a connected to the wireless network 10 and a display device 150b connected to the wireless receiving station 150a for rendering received video information, e.g. for displaying the video content. In this context, the wireless communicating station 150a is a wireless receiving station.

One may also note that the first wireless communicating node 100 may alternatively represent a relay device, in which case the source of the video information is then represented by another wireless communicating node 100' belonging to the communication network 10. Indeed, a meshed network typically comprises relay nodes for relaying data between different communicating nodes that cope with the short range of the millimeter wavelengths.

A data signal emitted by an antenna 135 of the first wireless communicating node 100 may reach an antenna 185 of the second wireless communicating node 150 through a line-of-sight (LOS) transmission path P0 if it is not perturbed by any obstacle therebetween.

In addition, the transmitted data signal may be reflected by any object OBJ which may cause the establishment of a plurality of non-line-of-sight (NLOS) transmission paths P1, P2 and P3.

Wireless transmitting stations may take advantage of this plurality of transmission paths to send, over each of them, either same or different data.

In most cases, although not mandatory, each of the first and second wireless communicating nodes 100-150 have both wireless transmitting and receiving functions to make it possible to establish two-way communications. This is particularly advantageous to add feedback control information to a reverse data flow.

Transmission data rate adaptation according to an embodiment of the invention is performed on original uncompressed video pixel information to obtain several complementary rate-reduced video frames to be transmitted over several transmission paths P0-P3 of the wireless communication link. Each complementary rate-reduced video frame requires a lower transmission data rate than the original frame. At the receiver, the complementary rate-reduced video frames received through the several transmission paths are combined to recover, when possible, uncompressed video pixel information as close as possible to the original pixel information.

One embodiment comprises a wireless communication system implementing a wireless communication process, wherein the transmission data rate of a video stream over each transmission path of the same communication link is dynamically adapted to the available communication bandwidth that a wireless communication medium (e.g. radio frequency channel) can provide. The wireless communication system provides a generalized multi-path transmission data rate adaptation scheme, wherein the multi-path transmission data rate can be smoothly adapted to a desired rate based on available communication bandwidth, with minimal video quality degradation.

The wireless communication system, in a wireless communication network, comprises a wireless transmitting station and a wireless receiving station. The wireless transmitting station is configured for transmitting video information to the wireless receiving station over a wireless communication link made of several transmission paths, and comprises an obtaining means for obtaining an uncompressed video frame made of an array of pixel blocks PBs, a pixel in the pixel blocks being represented by base pixel information and enhancement pixel information; a complementary pixel block generator for generating at least one set of complementary pixel blocks from a given pixel block of the obtained uncompressed video frame, by applying different operations to said given pixel block for dropping different enhancement pixel information from that pixel block, so that the complementary pixel blocks comprise different enhancement pixel information and each comprises the base pixel information; and a communication module for transmitting, for each set, the complementary pixel blocks over respective different transmission paths to the wireless receiving station.

The wireless receiving station comprises a communication module for receiving the transmitted pixel blocks over different transmission paths; and a pixel block reconstruction module for combining the received pixel blocks to generate a reconstructed pixel block which is enhanced compared to each of the received pixel blocks.

FIG. 1b illustrates, through functional blocks, such a wireless communication system 1. Each represented wireless communication station can implement both the transmitting and receiving functions to establish two way communications.

The wireless transmitting station 100 contains an application module 105 which delivers a well-known 4:4:4 uncompressed high definition video stream.

For instance, a typical HD uncompressed video such as 1080p is characterized by video frames of 1920 vertical lines and 1080 horizontal lines, 24 bits per pixel (4:4:4 sampling) and 60 Hz as frame rate.

Each pixel of the uncompressed video frame is defined by base and enhancement pixel information, for example by three video colour components Y, Cb and Cr, where Y is the base pixel information, known as luminance video component (or luma component) and represents the brightness of the image, i.e. the achromatic or "black & white" portion of the image;

Cb and Cr are the enhancement pixel information, known as chroma components and represent the colour information of the pixel—the blue information minus the brightness for Cb and the red information minus the brightness for Cr.

Each pixel colour component may be displayed with various colour depths, which means that the information relating to a pixel colour component may be coded over 8 bits, 12 bits, 16 bits or 32 bits, for instance.

For the purposes of illustration below, a pixel colour component will be assumed to be coded over 8 bits (i.e. 1 byte). A pixel is thus made of 24 bits of colour components.

The human vision system is less sensitive to colour than to brightness. More precisely, the human eye is able to distinguish more accurate details conveyed by the differences in the luma component than details conveyed by differences in the chroma component. This is why the luma component Y of a pixel is generally considered as the base pixel information, whereas the less significant chroma components are only enhancement pixel information that improves the primary pixel rendering based on the luma component only.

Based on this fact, the modern HD video formats use a technique referred to as "sub-sampling", which consists in dropping preferably enhancement Cb or Cr components—i.e. some 8-bit pixel colour components—from the Pixel Blocks of each video image, so as to decrease the bandwidth requirements for transmitting the HD video stream.

Still referring to FIG. 1b, the wireless transmitting station 100 also comprises a communication module 110 including a Protocol Adaptation Layer (PAL) 115, a Medium Access Control (MAC) layer 125 and a physical (PHY) layer 130.

The application module 105 sends the uncompressed video frames to the Protocol Adaptation Layer (PAL) 115 at given rate, referred to as full source rate. For instance, the full source rate is equal to 3 Gbps for a 4:4:4 uncompressed high definition video stream.

The Protocol Adaptation Layer (PAL) 115 comprises a rate adaptation and complementary pixel block generating module 120 further described below and implementing the present invention. The module 120 applies a sub-sampling process to each video frame received by PAL 115 from the Application module 105. In particular, it applies different operations to one (or more) pixel block of the current uncompressed video frame for dropping (i.e. deleting or removing) different enhancement pixel information from that pixel block, to generate at least one set of complementary pixel blocks comprising different enhancement pixel information and comprising, each, the base pixel information. A set of complementary pixel blocks is thus generated from each of several (or all) pixel blocks of the uncompressed video frame.

In one particular embodiment, the module 120 is furthermore configured to dynamically adjust the sub-sampling process according to one or more network conditions of the communication link, in order for the resulting complementary video frames to fit with the available multi-path medium rate. This is because the rate in a 60 Ghz millimeter wave band is not always able to support the full source rate. This is for example due to a degradation of the quality of the transmission paths, thus forcing the PHY layer to modify the channel coding and thus increasing the redundancy data (more redundancy data can makes the full source rate no longer supported).

The Protocol Adaptation Layer (PAL) 115 is also connected to the physical (PHY) layer 130 in order for the PAL to retrieve information about the network conditions to drive the rate adaptation and complementary pixel block generating module 120. Information about the network conditions may include quality information of each transmission path, characterized by, for example, a Radio Signal Strength Indication (RSSI) or a Signal-to-Noise Ratio (SNR) or the time for which the wireless transmitting station 100 has the wireless communication medium 10. From this network conditions information, the PHY layer indicates to the PAL the current network state or conditions. This information may be obtained periodically, even during the processing of a current video frame, thus enabling the module 120 to dynamically adapt the rate of each complementary video frame as is apparent from the following description.

The PAL 115 then sends the obtained rate-reduced (for instance sub-sampled) and complementary video frames to the MAC layer 125 where they are packetized to construct MAC Protocol Data Units for each of the transmission paths of the communication link. The MAC layer 125 also provides addressing and channel access control mechanisms.

Each MAC Protocol Data Unit is then transferred to the PHY layer 130 to construct a corresponding PHY Protocol Data Unit that is then transmitted over a respective wireless transmission path of the network 10 to the wireless receiving station 150. In particular, according to the invention, the complementary pixel blocks of each generated set are transmitted over respective different transmission paths to the wireless receiving station. In other words, for a given pixel block of the original uncompressed video frame, a pixel block resulting from sub-sampling some enhancement information is transmitted over one of the transmission paths while a corresponding complementary pixel block obtained by sub-sampling different enhancement information is transmitted over another transmission path, and so on.

In order to transmit data as HD video, the physical (PHY) layer 130 relies upon Millimeter Wave frequency bands, as for instance 60 GHz (or even higher) and the data are sent over the wireless medium 10 using one or more smart antennas 135.

Details of the complementary pixel block generating process according to various embodiments of the invention are provided below with reference to FIGS. 2 to 11.

The wireless receiving station 150 comprises an application module 155 and a communication module 160 which includes a Protocol Adaptation Layer (PAL) 165, a MAC layer 175 and a physical (PHY) layer 180.

The PHY layer 180 receives the packets send by the wireless transmitting station 100 over the several transmission paths P0-P3, via one or more smart antennas 185. This means that the wireless receiving station 150 may receive several complementary pixel blocks corresponding to the same original pixel block of a video frame. The physical (PHY) layer 180 then processes the received packets up to the MAC layer 175, which then processes the received data packets up to the Protocol Adaptation Layer (PAL) 165.

In the Protocol Adaptation Layer (PAL) 165, a pixel block reconstruction module 170 combined received pixel blocks to generate a reconstructed pixel block which is enhanced compared to each of the received pixel blocks. This is made possible since the received pixel blocks corresponding to the same original pixel block are complementary. In particular cases as illustrated below, the different enhancement pixel information dropping operations applied to a given pixel block at the wireless transmitting station 100 are defined so that a combination of the resulting complementary pixel blocks by the wireless receiving station provides all the pixel information of said given pixel block. In those cases, the above combination makes it possible to recover all the original pixel information of the pixel block.

However, where the combination of the received pixel blocks does not make it possible to recover all the original pixel information (for example because one of the transmission paths is perturbed), the reconstruction module 170 may apply an over-sampling process to obtain the particular missing pixel information.

The reconstruction module 170 then provides the application module 155 with uncompressed video frames made of all reconstructed pixel blocks, for example 4:4:4 video frames. The application module 155 is in charge of final processing the video frames for rendering.

FIG. 2 illustrates enhancement pixel information dropping operations based on typical state of the art sub-sampling schemes.

Usually, an uncompressed HD video image contains 1920 vertical lines and 1080 horizontal lines corresponding to 1920×1080 pixels.

The 1920×1080 pixels of an uncompressed HD video image may be seen as an array of blocks of pixels, noted PB for pixel blocks. A Pixel Block is made of a plurality of adjacent pixels. It is formed by n×m pixels, n rows and m columns pixels.

For the purposes of illustration, let the Pixel Blocks be made of 2×2 pixels in order to reduce the in-chip buffer size and processing latency, each pixel being represented by a base 8-bit luma component Y and two enhancement 8-bit chroma components Cr and Cb.

Several sub-sampling schemes, or enhancement pixel information dropping operations, have been standardized, such as 4:4:4, 4:2:2, 4:2:0 or 4:1:1 (the level of sub-sampling is often expressed by using a string of three integers separated by colons, the first integer representing the luminance sampling frequency while the other two integers represent the chroma sampling frequencies).

For the purposes of illustration of a first embodiment of the present invention, the 4:4:4, 4:2:2 and 4:2:0 sub-sampling schemes are considered, corresponding to three resolutions: 4:4:4 resolution referred to as a "high resolution", 4:2:2 resolution corresponding to a "medium resolution" and 4:2:0 resolution corresponding to a "low resolution".

FIG. 2 illustrates a high resolution Pixel Block 200, a medium resolution Pixel Block 210 and a low resolution Pixel Block 220.

The high resolution Pixel Block 200 contains four pixels 201, 202, 203 and 204. Each pixel is defined by three video components Y, Cb and Cr (4:4:4 sampling). A high resolution Pixel Block is then made of four luminance video components Y, four chroma video components Cb, and four chroma components Cr. Thus, the size of a high resolution Pixel Block 200 is 12 bytes. Such high resolution Pixel Block 200 is referenced HR_PB. The 4:4:4 scheme corresponds to the scheme of the uncompressed video frame provided by the application module 105. Consequently, to generate a pixel block having this 4:4:4 scheme (i.e. a HR_PB), the module 120 implements an operation that does not drop any enhancement pixel information from the source uncompressed pixel block, since the 12 pixel colour components are kept or remain "invariant".

The medium resolution Pixel Block 210 contains four pixels 211, 212, 213 and 214. As a 4:2:2 sub-sampling is applied, the chroma components are sampled at half the horizontal resolution of the luminance component, compared to a 4:4:4 sub-sampling scheme in this Pixel Block. Thus, pixels 211 and 213 are made of one luminance component and two chroma components while pixels 212 and 214 are made of only one luminance component. A medium resolution Pixel Block is then made of four luminance video components Y, two chroma video components Cb, and two chroma video components Cr. Thus, the size of a medium resolution Pixel Block 210 is 8 bytes, since only 8 pixel colour components remain "invariant". Such a Pixel Block is referenced MR_PB. The 4:2:2 sub-sampling scheme then corresponds to an enhancement pixel information dropping operation that drops at least one chroma component from the pixel block.

The low resolution Pixel Block 220 contains four pixels 221, 222, 223 and 224. As 4:2:0 sub-sampling is applied, the chroma components are sampled at half the horizontal and vertical resolutions of the luminance Y video component, compared to a 4:4:4 sub-sampling scheme. Thus, pixel 221 is made of one luma component and one chroma component Cr, pixel 223 is made of one luminance component and one chroma component Cb, while pixels 222 and 224 are made of only one luminance component. A low resolution Pixel Block is then made of four luminance video components Y, one chroma video component Cb, and one chroma video component Cr. Thus, the size of a medium resolution Pixel Block 220 is 6 bytes, since only 6 pixel colour components remain "invariant". Such a Pixel Block is referenced LR_PB. The 4:2:0 sub-sampling scheme then corresponds to an enhancement pixel information dropping operation that drops more chroma components within the pixel block than the 4:2:2 sub-sampling scheme.

From these examples, it can then seen that depending on the enhancement pixel information dropping operation used, the amount of enhancement pixel information (chroma colour components) that is dropped or kept varies. In particular, one may note that, whatever the enhancement pixel information dropping operation used, some pixel information is kept and remains unchanged. This is the case for all the base luma components, as well as for the Cr component of the first pixel and for the Cb component of the third (bottom left) pixel. Below, they are referred to as "fully invariant" pixel information or component.

For simplicity of the explanation below, the PB-based pixel information dropping operations according to the first embodiment of the invention include these three 4:4:4, 4:2:2 and 4:2:0 sub-sampling schemes, although the 4:4:4 scheme drops no enhancement pixel information from the source uncompressed PB (i.e. to be correct, the 4:4:4 scheme corresponds to a non-dropping operation or invariant dropping operation).

Of course, this embodiment of the invention may include other sub-sampling schemes (e.g. 4:1:1) and/or discard the 4:4:4 scheme.

One may thus understand that these sub-sampling schemes and corresponding adapted sub-sampling schemes as disclosed below are used to generate the complementary pixel blocks according to the invention from the same pixel block of an original uncompressed video frame, the complementary pixel blocks being thereafter transmitted over respective different transmission paths.

In one particular embodiment, the pixel information defining a pixel comprises (e.g. colour) components coded over a fixed number of bits, and the different enhancement pixel information dropping operations applied to the same pixel block PB further drop one or more least significant bits (known as LSB) of (colour) pixel components within the pixel block. This advantageously reduces the size of the resulting pixel block, and thus the network bandwidth use. For instance, the two LSBs of each colour component (including Y, Cb and Cr) may be dropped to reduce the size of Pixel Block 200 from 96 bits (i.e. 12 bytes) to 72 bits (i.e. 9 bytes). The same may be done to Pixel Blocks 210 and 220.

In a slight variant, a different number of LSBs may be dropped from the colour components depending on the resolution of the dropping operation. For example, a 4:4:4 or 4:2:2 dropping operation may only drop the 2 LSBs of each 8-bit colour component, while a 4:2:0 dropping operation may drop the 4 LSBs of each 8-bit colour component.

FIG. 3 represents an exemplary Macro Pixel Block resulting from the implementation of a process according to the present invention. Such resulting MPB may be one of the obtained complementary Macro Pixel Blocks that is transmitted over one of the available transmission paths of the current communication link. Of course, several complementary Macro Pixel Blocks are consequently generated from the same original uncompressed Macro Pixel Block according to the invention, to obtain a set of complementary MPBs, each of them being transmitted over the different transmission paths.

A complementary rate-reduced video frame obtained by the invention (several are obtained from the same original video frame for several transmission paths) may comprise an array of such macro pixel blocks mixing HR_PB, MR_PB and LR_PB therein according to a plurality of patterns. Below, the patterns are referred to as "dropping profiles".

A Macro Pixel Block, or MPB, is made of a plurality of N×M adjacent Pixel Blocks.

In the example of the Figure, a MPB is made of 4×4 PBs, 301, 302, 303, 304, 305, 306, 307, 308, 309, 310, 311, 312, 313, 314, 315 and 316, also referenced PB(i,j) with the row index i from 1 to 4 and the column index j from 1 to 4. A HD video frame may then comprise 32,400 MPBs of such size (i.e. of sixteen 4-pixel PBs).

Other MPB sizes may be contemplated within the scope of this embodiment of the invention, for example 2×2, 2×4, 4×2, 4×8, 8×4, 8×8 PBs, etc.

Different enhancement pixel information dropping operations may be applied to the pixel blocks of the MPB as illustrated in the Figure. In that case, each Pixel Block of a resulting MPB is either a high, medium or low resolution Pixel Block. In particular some pixel blocks are of high resolution (HR_PB), namely pixel blocks 301, 303, 306, 308, 309, 311, 314 and 316 in the example of the figure; some are of medium resolution (MR_PB), namely pixel blocks 304, 307, 310 and 313; and some are of low resolution (LR_PB), namely pixel blocks 302, 305, 312 and 315.

The pattern of HR_PB, MR_PB and LR_PB within the complementary MPB of FIG. 3 defines an enhancement pixel information dropping profile that can be applied to any MPB of the uncompressed video frame to generate one complementary MPB. Of course, several complementary MPB (to be transmitted over several transmission paths of the same communication link) will be generated from the same original uncompressed MPB using several and complementary enhancement pixel information dropping profiles.

In other words, an enhancement pixel information dropping profile defines positions of chroma components to drop (i.e. remove) within an array MPB of pixel blocks. An enhancement pixel information dropping profile also defines the enhancement pixel information dropping operations to be applied to a plurality of pixel blocks to generate the complementary pixel blocks to be transmitted over the same transmission path.

The enhancement pixel information dropping profile applied to a MBP may be selected from a set of (e.g. eight) predetermined dropping profiles.

FIG. 4 illustrates ten predetermined enhancement pixel information dropping profiles each defining the pattern of enhancement pixel information to drop within a MPB.

Based on the above three sub-sampling schemes (4:4:4, 4:2:2 or 4:2:0), up to $3^{16}$ different dropping profiles can be built. In the example of the Figure, only ten dropping profiles are defined. Such a configuration advantageously limits the number of bits needed to indicate the dropping profiles used for a given transmission path, to the wireless receiving station (four bits per MPB). A set with eight predetermined dropping profiles further improves the use of bits to indicate the used dropping profiles (only three bits per MPB are needed in that case).

The ten dropping profiles are referenced 401, 402, 403, 404, 405, 406, 407, 408, 409 and 410 in the Figure. Eight of them combine pixel blocks associated with different sub-sampling schemes. This means that, when applying one of these eight profiles to an uncompressed MPB, two different enhancement pixel information dropping operations are applied to two pixel blocks within the same MPB, to generate the complementary MPBs to be transmitted together over one of the transmission paths.

As may be observed in these eight dropping profiles, each of the enhancement pixel information dropping operations applied to four pixel blocks adjacent to a central pixel block keeps more enhancement pixel information than the enhancement pixel information dropping operation applied to the central pixel block. In other words, the high, medium and low resolution Pixel Blocks are interleaved within a complementary Macro Pixel Block so that a low-resolution Pixel Block is adjacent to four higher-resolution Pixel Blocks (either medium or high resolution). Preferably, this adjacency is performed inside the Macro Pixel Block but also between any two adjacent Macro Pixel Blocks transmitted over the same transmission path.

One main advantage of using this adjacency scheme is to ensure that during the reconstructing process performed by the reconstruction module 170, a missing enhancement component (i.e. a video component dropped during application of an enhancement pixel information dropping operation by the module 120) is recovered from an adjacent video component. This is for example illustrated below with reference to FIG. 5. Therefore, the propagation of an error, resulting from the mismatch between the recovered video component and the original component before dropping, is significantly reduced.

The dropping profiles 401, 402, 403, 404, 405, 406, 407, 408, 409 or 410 allow complementary MPBs to be built with different sizes (i.e. compression ratios), depending on how many pixel colour components are dropped. One may then easily understand that by switching between the dropping profiles, the video rate will change for each next MPB concerned by the same transmission path.

Selecting the appropriate dropping profile to apply to a current MPB to process, depending on the network conditions for example, thus offers a dynamic adaptation of the video rate over each transmission path. The dropping profiles can then be seen as a set of intermediate rate adaptation levels, which provide a higher number of rate adaptation levels for each separate MPB compared to the three levels of the prior art: 4:4:4, 4:2:2 and 4:2:0 applied to the whole video frame. For example, while the three conventional resolution profiles (4:4:4, 4:2:2, and 4:2:0) define three different compression ratios for a whole video frame: 0% for 4:4:4, 33% for 4:2:2 and 50% for 4:2:0, the dropping profiles of FIG. 4 define ten different compression ratios that may be used for each MPB: 0%, 8%, 12%, 17%, 21%, 25%, 29%, 33%, 37% and 42% (respectively corresponding to dropping profiles 401, 402, 403, 404, 405, 406, 407, 408, 409 and 410). This set of dropping profiles thus makes it possible for the wireless transmitting station to process video data in such a way that it fits closely to the available bandwidth of each transmission path.

In the dropping profile 401, the operations to apply to all the pixels blocks do not drop any enhancement pixel information but keep the pixel information invariant. The dropping profile 401 (to be correct, a non-dropping profile or invariant dropping profile) then corresponds to only 4:4:4 Pixel Blocks, and the size of the dropping profile 401 is defined as 192 bytes (one byte for each of the three colour components of the four pixels of the 16 pixel blocks).

Applying this dropping profile to all the Macro Pixel Blocks of a video frame leads to a state-of-the-art 4:4:4 resolution video frame.

In the dropping profile 402, the enhancement pixel information dropping operations to apply to the Pixel Blocks PB(1,4), PB(2,3), PB(3,2) and PB(4,1) correspond to the 4:2:2 sub-sampling scheme, thus resulting for these Pixel Blocks in being 4:2:2 PBs while the other PBs remain 4:4:4 Pixel Blocks. The size of this dropping profile 402 is 176 bytes.

In the dropping profile 403, the enhancement pixel information dropping operations to apply to the Pixel Blocks PB(1,4), PB(2,3), PB(3,2) and PB(4,1) correspond to the 4:2:0 sub-sampling scheme, thus resulting for these Pixel Blocks in being 4:2:0 PBs while the others remain 4:4:4 Pixel Blocks. The size of this dropping profile 403 is 168 bytes.

In the dropping profile 404, the enhancement pixel information dropping operations to apply to the Pixel Blocks PB(1,2), PB(1,4), PB(2,1), PB(2,3), PB(3,2), PB(3,4), PB(4,1), PB(4,3) correspond to the 4:2:2 sub-sampling scheme, thus resulting for these Pixel Blocks in being 4:2:0 PBs while the others remain 4:4:4 Pixel Blocks. The size of this dropping profile 404 is 160 bytes.

In the dropping profile 405, the enhancement pixel information dropping operations to apply to the Pixel Blocks PB(1,4), PB(2,3), PB(3,2) and PB(4,1) correspond to the 4:2:2 sub-sampling scheme, the dropping operations to apply to the Pixel Blocks PB(1,2), PB(2,1), PB(3,4) and PB(4,3) correspond to the 4:2:0 sub-sampling scheme, thus resulting for the latter in being 4:2:0 PBs and for the first ones in being 4:2:2 PBs while the others remain 4:4:4 Pixel Blocks. The size of this dropping profile 405 is 152 bytes.

In the dropping profile 406, the operations to apply to the Pixel Blocks PB(1,4), PB(2,3), PB(3,2), PB(4,1) do not drop any enhancement pixel information (i.e. correspond to 4:4:4 sub-sampling scheme), while the enhancement pixel information dropping operations to apply to the other PBs correspond to the 4:2:2 sub-sampling scheme. The size of this dropping profile 406 is 144 bytes.

In the dropping profile 407, the enhancement pixel information dropping operations to apply to the Pixel Blocks PB(1,4), PB(2,3), PB(3,2) and PB(4,1) correspond to the 4:2:0 sub-sampling scheme, the operations to apply to the Pixel Blocks PB(1,1), PB(2,2), PB(3,3) and PB(4,4) do not drop any enhancement pixel information (i.e. correspond to 4:4:4 sub-sampling scheme), while the enhancement pixel information dropping operations to apply to the other PBs correspond to the 4:2:2 sub-sampling scheme. The size of this dropping profile 407 is 152 bytes.

In the dropping profile 408, the enhancement pixel information dropping operations to apply to all the Pixels blocks correspond to the 4:2:2 sub-sampling scheme. The size of this dropping profile 408 is 128 bytes.

Applying this dropping profile to all the Macro Pixel Blocks of a video frame leads to a state-of-the-art 4:2:2 resolution video frame.

In the dropping profile 409, the enhancement pixel information dropping operations to apply to the Pixel Blocks PB(1,4), PB(2,3), PB(3,2) and PB(4,1) correspond to the 4:2:0 sub-sampling scheme, and the enhancement pixel information dropping operations to apply to the other PBs correspond to the 4:2:2 sub-sampling scheme. The size of this dropping profile 409 is 120 bytes.

In the dropping profile 410, the enhancement pixel information dropping operations to apply to the Pixel Blocks PB(1,2), PB(1,4), PB(2,1), PB(2,3), PB(3,2), PB(3,4), PB(4,1), PB(4,3) correspond to the 4:2:0 sub-sampling scheme, and the enhancement pixel information dropping operations to apply to the other PBs correspond to the 4:2:2 sub-sampling scheme. The size of this dropping profile 410 is 112 bytes.

Applying any of the dropping profiles 402, 403, 404, 405, 406, 407 and 409 to all the Macro Pixel Blocks of an uncompressed video frame leads to a video frame that mixes PBs having a variable number of colour components (4:4:4, 4:2:2, 4:2:0) and the size in bytes of which (video frame) is intermediate to the size of a 4:4:4, 4:2:2 or 4:2:0 resolution video frame.

Figure 5:
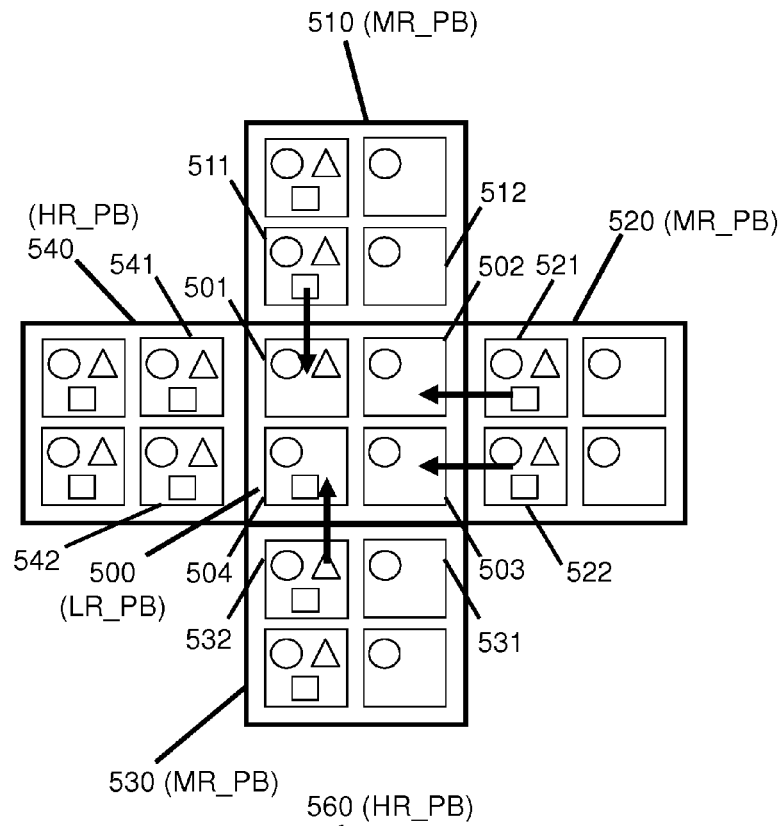
FIG. 5 illustrates a reconstruction process based on an adjacency scheme according to the invention.
Figure 5:
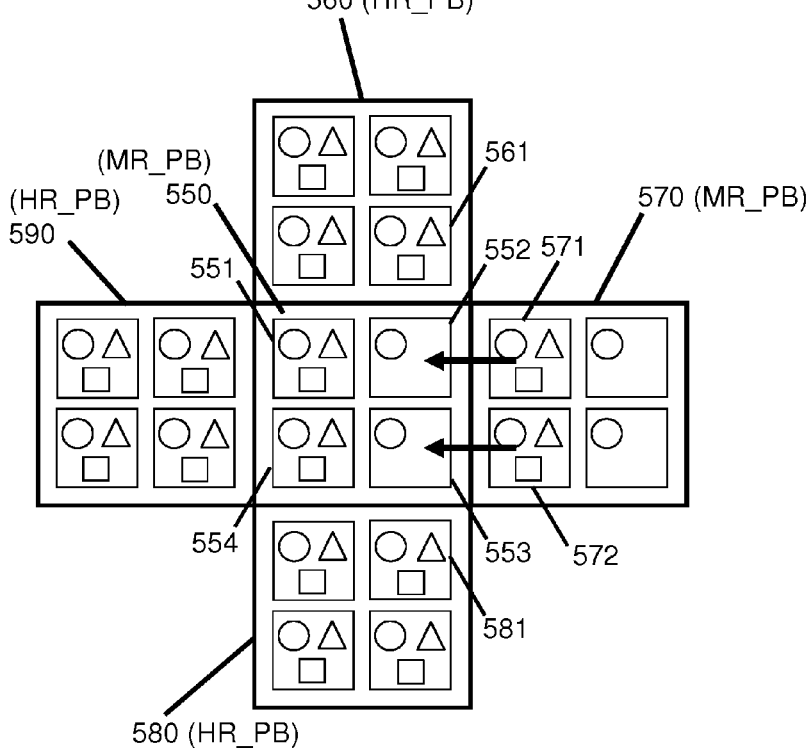

FIG. 5 illustrates one advantage of using the adjacency scheme introduced above. In particular, it makes it possible to use an efficient process for reconstructing uncompressed video pixels from the received sub-sampled video pixels (in the received complementary rate-reduced video frames), in particular when some pixel colour components cannot be retrieved from the received data. This is the case when only one complementary video frame of a set is received, the other ones being lost over perturbed transmission paths, or when the received complementary video frames of a set do not make it possible to retrieve all the original pixel information by their combination (e.g. the dropping operations applied at the wireless transmitting station 100 have lost pixel information).

The process takes place within the reconstruction module 170 to recover the missing pixel information.

Reconstructing uncompressed video pixel from sub-sampled video pixels may be based on interpolation or duplication from neighbouring pixels.

The reconstruction module 170 may receive the complementary rate-reduced video frame or frames in one shot, or may receive it or them by streaming, i.e. packet of part of a complementary video frame after packet over a corresponding transmission path. Flags or structure within the data in the packets makes it possible for the wireless receiving station 150 to parse the data corresponding to each complementary Macro Pixel Block.

For each received MPB, the reconstruction module 170 is able to retrieve the corresponding enhancement pixel information dropping profile applied by the module 120. This may be done based on an additional header provided together with the pixel information of the received MPB, for example through an identifier of the applied enhancement pixel information dropping profile associated with the received MPB. This may also be done using the same identifier but this time inserted in replacement of at least part of a colour component of a "fully invariant" pixel in the transmitted MPB, for example a kept enhancement chroma component which is less significant than a base luma component for rendering. In another variant, it is performed seamlessly, i.e. the reconstruction module 170 is able, based on received data (for example all or part of the luma components composing the MPB to process), to determine the applied pixel information dropping profile.

Based on the retrieved enhancement pixel information dropping profile, the reconstruction module 170 knows the dropping operations applied to each PB, and then the resolution of each complementary PB within the current received MPB, i.e. the pixel information missing from each PB. This is for example according to the patterns as shown in FIG. 4.

Upon reception of the transmitted MPB, the reconstruction module 170 first reconstructs the LR_PB pixel blocks (4:2:0) to obtain HR_PB pixel blocks (4:4:4), and then reconstructs the MR_PB pixel blocks (4:2:2) to obtain HR_PB pixel blocks (4:4:4). This results in having only HR_PB pixel blocks (4:4:4), i.e. an uncompressed MPB or video frame has been recovered.

FIG. 5 illustrates the recovery of pixel information in a LR_PB and in a MR_PB, where the above adjacency scheme has been applied by the module 120.

The reconstruction module 170 obtains the Pixel Blocks 500, 510, 520, 530 and 540, where the central pixel block 500 to reconstruct is LR_PB and its adjacent pixel blocks are of higher resolution, i.e. either HR_PB (PB 540) or MR_PB (PBs 510, 520 and 530).

The reconstruction of pixel block 500 is done by interpolation from the adjacent pixel blocks.

The interpolation of pixel block 500 comprises:
  to recover the Cb component of pixel 501: interpolation (e.g. computing the mean) of the Cb components of its adjacent pixels from the adjacent pixel blocks (i.e. from pixels 511 and 541). In particular, only the adjacent pixel blocks having the lowest resolution (here MR_PB) may be taken into account. In the example of the Figure, this results in the duplication of the Cb video component of pixel 511 (since 510 is MR_PB while 540 is HR_PB);
  to recover the Cb and Cr components of pixel 502: interpolation (mean) of respectively the Cb and Cr components of its adjacent pixels from the adjacent pixel blocks (i.e. from pixels 512 and 521). In particular, only the adjacent pixel blocks having the lowest resolution may be taken into account. In the example of the Figure, this results in the duplication of the Cb and Cr video components of pixel 521 (since pixel 512 does not have any Cb or Cr component);
  to recover the Cb and Cr components of pixel 503: interpolation (mean) of respectively the Cb and Cr components of its adjacent pixels from the adjacent pixel blocks (i.e. from pixels 522 and 531). In particular, only the adjacent pixel blocks having the lowest resolution may be taken into account. In the example of the Figure, this results in the duplication of the Cb and Cr video components of pixel 522 (since pixel 532 does not have any Cb or Cr component);
  to recover the Cr component of pixel 504: interpolation (mean) of the Cr components of its adjacent pixels from the adjacent pixel blocks (i.e. from pixels 532 and 542). In particular, only the adjacent pixel blocks having the lowest resolution may be taken into account. In the example of the Figure, this results in the duplication of the Cr video component of pixel 532 (since 530 is MR_PB while 540 is HR_PB).

When this interpolation process has been applied to all the LR_PBs to recover HR_PBs, the reconstruction module 170 then processes the MR_PBs in a similar manner. The reconstruction module 170 obtains the Pixel Blocks 550, 560, 570, 580 and 590, where the central pixel block 550 to reconstruct is MR_PB and its adjacent pixel blocks are of the same or higher resolution, i.e. either HR_PB (PBs 560, 580 and 590) or MR_PB (PB 570).

The reconstruction of pixel block 550 is done by interpolation from the adjacent pixel blocks.

The interpolation of pixel block 550 comprises:
  to recover the Cb and Cr components of pixel 552: interpolation (mean) of respectively the Cb and Cr components of its adjacent pixels from the adjacent pixel blocks (i.e. from pixels 561 and 571). In particular, only the adjacent pixel blocks having the lowest resolution (here MR_PB) may be taken into account. In the example of the Figure, this results in the duplication of the Cb and Cr video components of pixel 571 (since 570 is MR_PB while 560 is HR_PB);
  to recover the Cb and Cr components of pixel 553: interpolation (mean) of respectively the Cb and Cr components of its adjacent pixels from the adjacent pixel blocks (i.e. from pixels 572 and 581). In particular, only the adjacent pixel blocks having the lowest resolution may be taken into account. In the example of the Figure, this results in the duplication of the Cb and Cr video components of pixel 572 (since 570 is MR_PB while 580 is HR_PB).

Following the interpolation of the MR_PBs, the reconstruction module 170 has thus reconstructed a high resolution MPB or video frame (4:4:4), i.e. an uncompressed video frame. The obtained 4:4:4 video frame is then transferred to the Application Layer 155 for further processing (such as rendering).

One skilled in the art will easily understand that reconstruction schemes other than the above interpolations may be implemented within the scope of the present invention.

Above, the enhancement pixel information dropping profiles (FIG. 4) made of dropping operations defined by 4:4:4 PBs and/or 4:2:2 PBs and/or 4:2:0 PBs (FIGS. 2 and 3) have been illustrated. According to the invention, they are used to generate a set of complementary MPBs made of pixel blocks from the same uncompressed MPB. The pixel blocks collocated within the complementary MPBs are complementary pixel blocks. A set of complementary video frames is also generated.

For the purposes of illustration, it is considered that a pair of complementary pixel blocks is generated from the same uncompressed pixel block (i.e. a pair of complementary MPBs is generated). This may be implemented when two transmission paths are available in the communication link between the wireless transmitting station 100 and the wireless receiving station 150.

FIG. 6 illustrates two complementary enhancement pixel information dropping operations OP1-OP2 used to generate such a pair from the same original pixel block 600, according to an embodiment of the invention. These two complementary operations are based on 4:2:2 sub-sampling schemes.

Pixel Blocks 610 and 620 are both 4:2:2 Pixel Blocks derived from the 4:4:4 Pixel Block 600 of the video frame, using two different and complementary 4:2:2 sub-sampling operations OP1-OP2.

The enhancement pixel information dropping operation OP1 used for obtaining Pixel Block 610 is the state of the art sub-sampling scheme used for low-resolution Pixel Block 210, described with reference to FIG. 2.

The enhancement pixel information dropping operation OP2 used for obtaining Pixel Block 620 is a complementary sub-sampling scheme wherein, instead of dropping the Cb and Cr video components of pixels 622 and 624 (like the state of the art sub-sampling scheme 4:2:2 does), Cb and Cr video components of pixels 621 and 623 are dropped.

In other words, the complementary enhancement pixel information dropping operations OP1-OP2 comprise a sub-sampling operation applied to the four-pixel block 600 according to a 4:2:2 scheme that drops the chroma colour components from two out of the four pixels, and a sub-sampling operation applied to the four-pixel block according to a 4:2:2 scheme that drops the chroma colour components from the other two pixels.

One may note that Pixel Blocks 610 and 620 are fully complementary since combining them together makes it possible to retrieve the original uncompressed 4:4:4 Pixel Block 600. All the original pixel information may, indeed, be recovered through pixels 611 and 613 of Pixel Block 610, and pixels 622 and 624 of Pixel Block 620.

Figure 7:
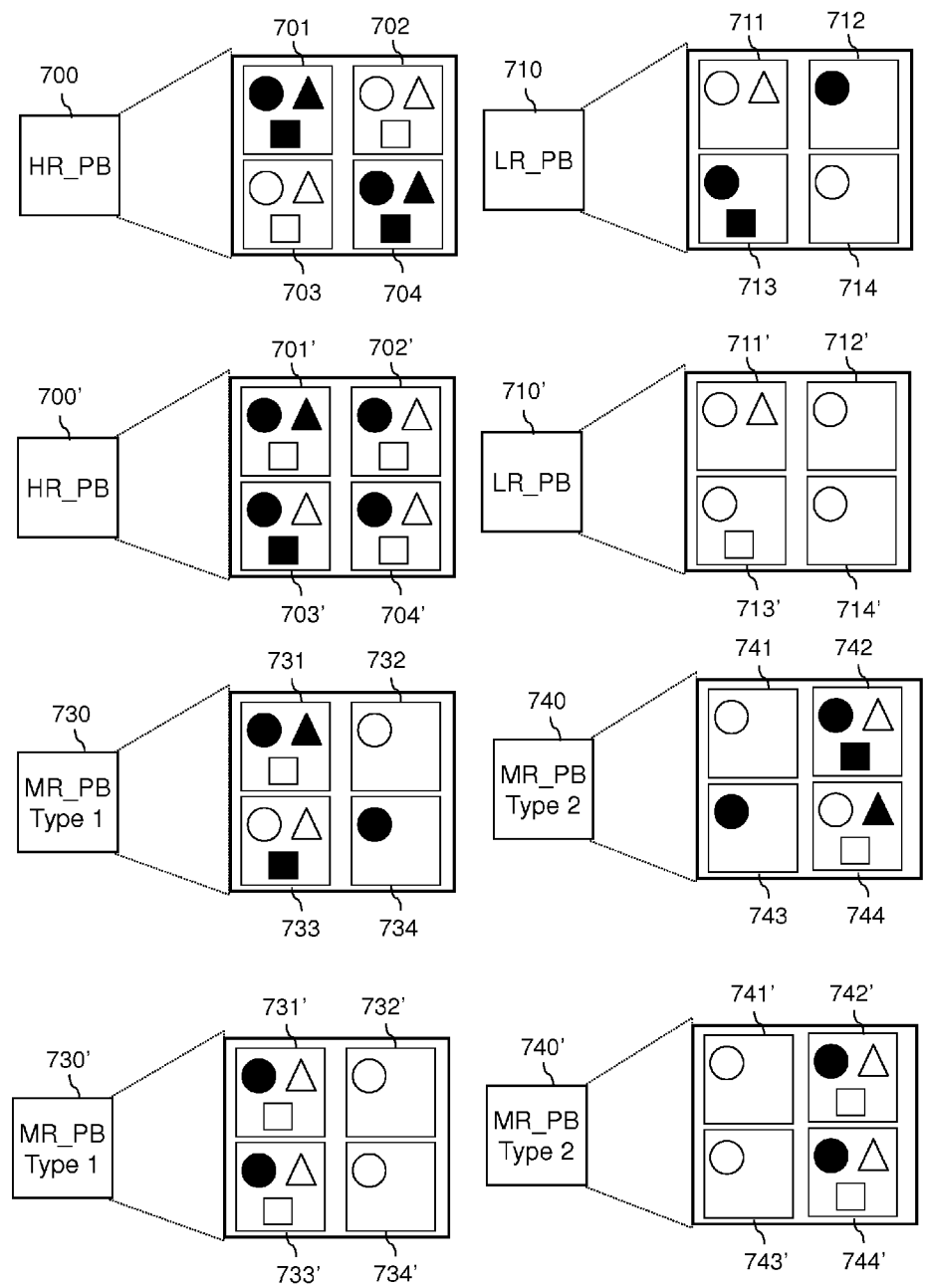
FIG. 7 illustrates various pairs of complementary dropping operations that may be implemented by the invention.

FIG. 7 illustrates other examples of complementary enhancement pixel information dropping operations further including dropping least significant bits of some colour components (or LSB dropping). Using this LSB dropping makes it possible to further decrease the rate of each complementary video frame or MPB.

Again on the left is the pixel block obtained by applying a first dropping operation OP1, and on the right is the complementary pixel block obtained by applying the complementary dropping operation OP2.

Using the same symbols as in FIG. 2, the dark colour components correspond to colour components from which some LSBs have been dropped by the applied dropping operation OP1 or OP2. The white colour components have all their bits kept.

The number of LSBs dropped by OP1 and/or OP2 may vary. Based on 8-bit colour components, the LSB dropping may drop 2 LSBs for example. However, this number may be increased if the available transmission path rates decreases.

Of course, a different number of LSBs may be dropped from two different colour components within the same pixel block. For example, a high number of LSBs may be dropped from colour components of a pixel block when the same colour components of the complementary pixel block (obtained by the other dropping operation) is entirely kept. On the contrary, when a colour component is not kept in the complementary pixel block, dropping LSBs may be avoided or a very few number of such LSBs should be dropped.

The two first pairs of complementary pixel blocks result from a sub-sampling operation applied to the four-pixel block according to a 4:2:0 (4:1:1 may also be considered) scheme that drops chroma colour components from all the four pixels, and a sampling operation applied to the four-pixel block according to a 4:4:4 scheme that keeps all the colour components of the pixel block. However some LSBs of some colour components have been dropped. Such an arrangement may be used when a transmission path (used to convey the 4:4:4 complementary video frames) has a higher bandwidth than a second transmission path (used to convey the 4:2:0 complementary video frames).

The first pair 700-710 provides "partially complementary" pixel blocks since when combining them together, the original pixel information cannot be recovered entirely. This is for example the case for the Cb and Cr components of pixel 704 (some LSBs of which will be missing).

The second pair 700'-710' provides "fully complementary" pixel blocks since when combining them together, all the original pixel information is recovered. In this second pair, complementary pixel block 710' has no LSBs dropped. Of course, other implementations may be envisaged in such a way that both complementary pixel blocks 700' and 710' have at least one LSB dropped from a colour component (e.g. by switching the LSB dropping of the luma components from pixels 701' and 702' to pixels 711' and 712').

The two last pairs of FIG. 7 are based on the 4:2:2 sub-sampling schemes of FIG. 6. Compared to the latter, they have some colour components from which LSBs have been dropped.

The first pair 730-740 provides "partially complementary" pixel blocks since when combining them together, the original pixel information cannot be recovered entirely. This is for example the case for the Cb components of pixels 733 and 742 and the Cr components of pixels 731 and 744.

In Pixel Block 730, video component Cb of pixel 731, video component Y of pixel 732 and video components Y and Cr of pixel 733 are 8-bit video components while some of the least significant bits (e.g. 2 bits) of the remaining video components in pixels 731, 733 and 734 have been dropped.

In Pixel Block 740, video component Y of pixel 741, video component Cr of pixel 742 and video components Y and Cb of pixel 744 are 8-bit video components while some of the least significant bits of the remaining video components in pixels 742, 743 and 744 have been dropped.

The second pair 730'-740' provides "fully complementary" pixel blocks since when combining them together, all the original pixel information is recovered. In this second pair, only LSBs from base luma components have been dropped but are kept in the complementary pixel block.

Based on these examples of FIGS. 6 and 7, one skilled in the art can easily understand that a large number of fully or partially complementary dropping operations OPi (i possibly greater than 2) may be contemplated.

These complementary dropping operations may thus be implemented within complementary enhancement pixel information dropping profiles as briefly introduced above with reference to FIGS. 3 and 4.

Figure 8:
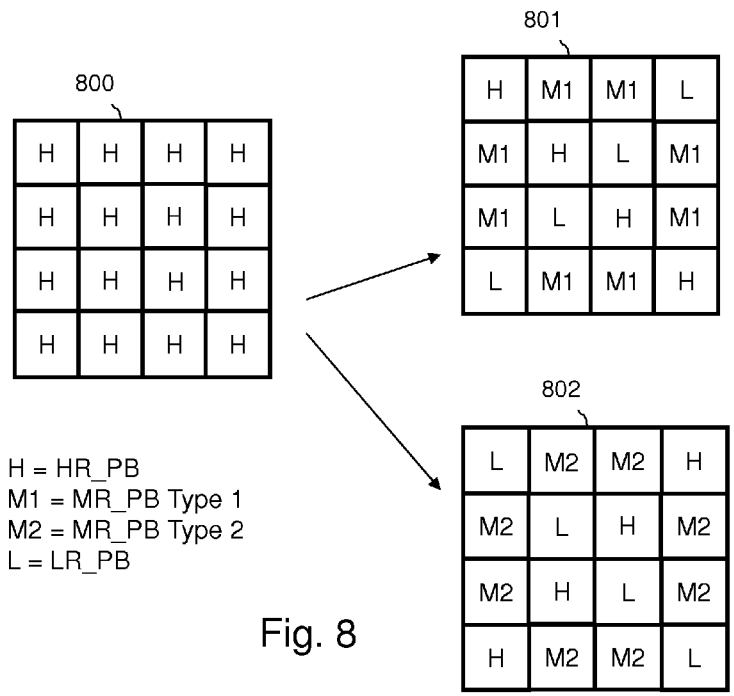
FIG. 8 illustrates complementary enhancement pixel information dropping profiles applied to the same Macro Pixel Block according to the invention.

FIG. 8 illustrates two complementary enhancement pixel information dropping profiles according to the invention.

The dropping profile 800 is the same as profile 401 of FIG. 4, i.e. a 4:4:4 MPB. The complementary dropping profiles 801 and 802 may be generated from profile 800 based on complementary sub-sampling schemes (as for example those described above with reference to FIGS. 6 and 7).

In the illustrative example, the dropping profile 801 derives from the 4:4:4 profile 800 according to the following design, and results in the dropping profile 407 of FIG. 4:

PB(1,1), PB(2,2), PB(3,3) and PB(4,4) are 4:4:4 dropping operations, that keep the original Pixel Blocks, for example as for Pixel Block 200 in FIG. 2 (possibly with some LSBs dropped as illustrated in Pixel Block 700 or 700' of FIG. 7);

PB(1,2), PB(1,3), PB(2,1), PB(2,4), PB(3,1), PB(3,4), PB(4,2) and PB(4,3) are 4:2:2 dropping operations of a first type, for example the type of Pixel Block 610 in FIG. 6 or of Pixel Block 730 or 730' in FIG. 7; and PB(4,1), PB(3,2), PB(2,3) and PB(1,4) are 4:2:0 dropping operations, for example that of Pixel Block 220 in FIG. 2 or of Pixel Block 710 or 710' in FIG. 7).

Similarly, the complementary dropping profile 802 derives from the 4:4:4 profile 800 according to a complementary design, as follows:

PB(1,1), PB(2,2), PB(3,3) and PB(4,4) are 4:2:0 dropping operations complementary to the 4:4:4 dropping operations of the collocated pixel blocks in the complementary dropping profile 801, for example the dropping operations corresponding to Pixel Block 220 in FIG. 2 (possibly with some LSBs dropped as illustrated in Pixel Block 710 or 710' of FIG. 7);

PB(1,2), PB(1,3), PB(2,1), PB(2,4), PB(3,1), PB(3,4), PB(4,2) and PB(4,3) are 4:2:2 dropping operations of a second type that is complementary to the first type used to define the collocated pixel blocks in the complementary dropping profile 801. Thus, this may be the type of Pixel Block 620 in FIG. 6 or of Pixel Block 740 or 740' in FIG. 7; and PB(4,1), PB(3,2), PB(2,3) and PB(1,4) are 4:4:4 dropping operations complementary to the 4:2:0 dropping operations of the collocated pixel blocks in the complementary dropping profile 801, for example the dropping operations corresponding to Pixel Block 200 in FIG. 2 (possibly with some LSBs dropped as illustrated in Pixel Block 700 or 700' of FIG. 7).

Figure 9:
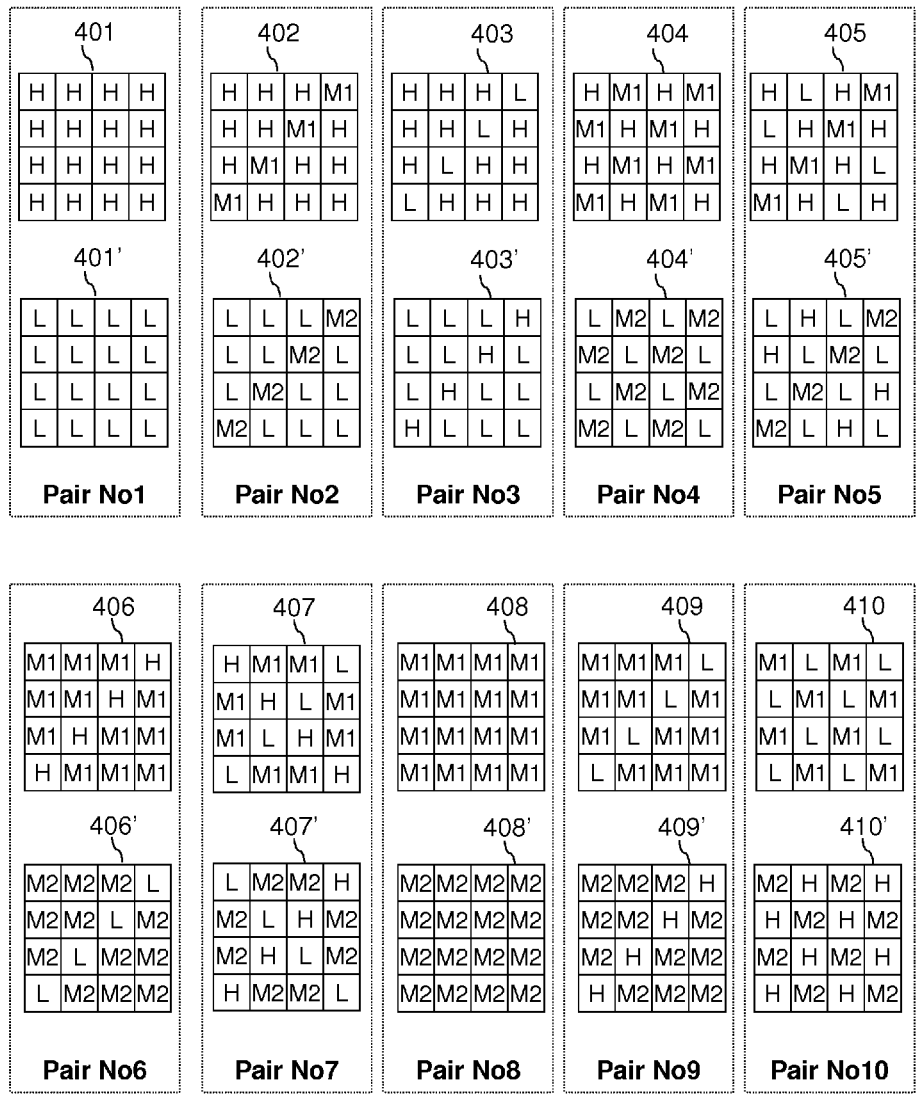
FIG. 9 illustrates various pairs of complementary dropping profiles based on the dropping profiles of FIG. 4.

Using this approach, the ten dropping profiles complementary to the dropping profiles of FIG. 4 can be built. FIG. 9 illustrates the resulting ten pairs of complementary dropping profiles where 4xx designates a dropping profile and 4xx' its complementary dropping profile. For example, H and L are complementary dropping operations as illustrated in FIG. 7 (the first two pairs). M1 and M2 (respectively first type of MR_PB and second type of MR_PB) are also complementary dropping operations as illustrated in FIG. 6 or FIG. 7 (the last two pairs).

This is obvious from the above explanation that the complementary macro pixel blocks resulting from applying complementary dropping profiles to the same uncompressed MPB may be efficiently combined together when both are received by the wireless receiving station 150.

In particular, PB(1,1), PB(2,2), PB(3,3) and PB(4,4) of the Macro Pixel Block 801 (reference is made here to "MPB 801" instead of the "MPB obtained when applying the dropping profile 801" for simplification of the explanation) are 4:4:4 Pixel Blocks while PB(1,1), PB(2,2), PB(3,3) and PB(4,4) belonging to its complementary Macro Pixel Block 802 are 4:2:0 Pixel Blocks. The same combining as discussed above with reference to FIG. 7 (in case of LSB dropping) may be performed enabling only 4:4:4 Pixel Blocks to be retrieved.

For instance, combining the video components of each pixel belonging to PB(1,1) of Macro Pixel Block 801 with those belonging to PB(1,1) of Macro Pixel Block 802 makes it possible to recover, for each pixel of the Pixel Block resulting from that combination, the pixel information for each video component Y, Cb and Cr (which is actually the information carried within the pixels of PB(1,1) of Macro Pixel Block 801). In the same way, the combination of PB(4,1), PB(3,2), PB(2,3) and PB(1,4) belonging to Macro Pixel Block 801, which are 4:2:0 Pixel Blocks, with PB(4,1), PB(3,2), PB(2,3) and PB(1,4) belonging to Macro Pixel Block 802, which are 4:4:4 Pixel Blocks, results in 4:4:4 Pixel Blocks.

Similarly, any two collocated 4:2:2 Pixel Blocks of Macro Pixel Block 801 and Macro Pixel Block 802 may be combined to obtain only 4:4:4 Pixel Blocks, since they are complementary. This combination can be performed as discussed above with reference to FIG. 6 or FIG. 7.

For instance, combining the video components of each pixel belonging to PB(1,2) of Macro Pixel Block 801 with those belonging to PB(1,2) of Macro Pixel Block 802 makes it possible to recover, for each pixel of the Pixel Block resulting from this combination, the pixel information for each video component Y, Cb and Cr.

Of course, if "fully complementary" dropping operations have been used (such as 610 and 620 in FIG. 6, or 700' and 710', or 730' and 740' in FIG. 7), the entire pixel information of each original pixel can be retrieved. The original uncompressed video frame (or at least pixel block) can then be recovered by the wireless receiving station 150.

On the contrary, if "partially complementary" dropping operations have been used (such as 700 and 710, or 730 and 740 in FIG. 7), the entire pixel information of each pixel cannot be retrieved, some LSBs being missing in some colour components. In this context, the wireless receiving station 150 may proceed with interpolation of the missing LSBs from neighbouring pixels, or may use padding bits. The same will be applied when the wireless receiving station 150 receives only some of the complementary pixel blocks from the same set, for example when receiving only one complementary pixel block for a given pixel block to be reconstruct in a video frame.

Figure 10:
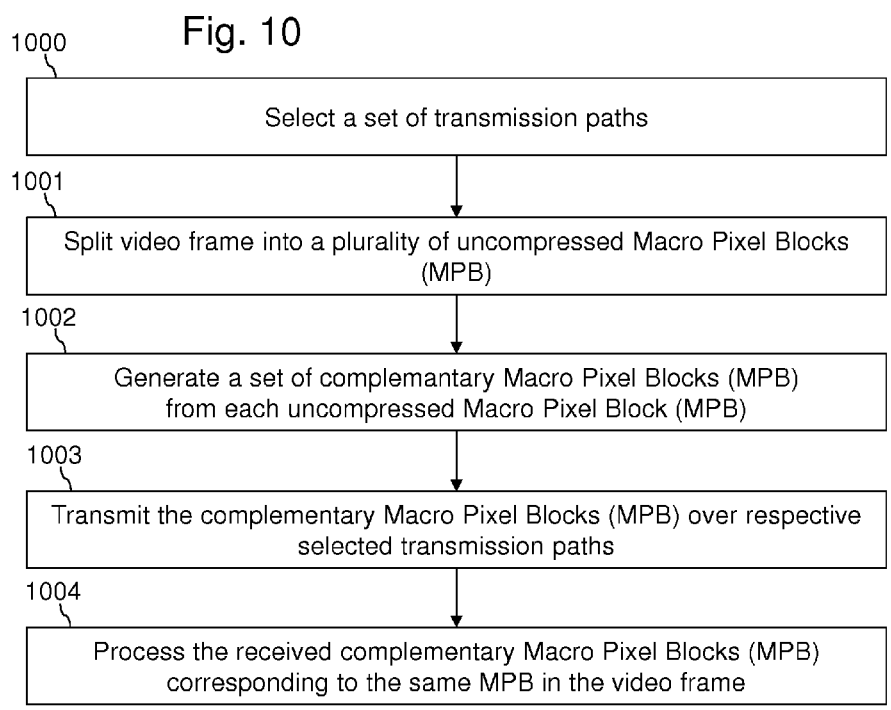
FIG. 10 is a flowchart illustrating general steps of a method according to one embodiment of the invention.

FIG. 10 illustrates general steps of the first embodiment of the invention based on the above-defined complementary enhancement pixel information dropping operations/profiles and resulting complementary PBs/MPBs/video frames. While the above description concentrates on pairs of complementary dropping operations (profiles) and resulting pairs of complementary pixel blocks (MPBs, video frames), the invention may involve a greater number of complementary dropping operations applied to the same uncompressed pixel block to obtain a set of more than two complementary pixel blocks.

In some particular cases, the number of complementary dropping operations may change when processing the uncompressed video stream by the wireless transmitting station 100, to react to changes in network conditions. For example, if some transmission paths disappear (for instance, because they are perturbed by an unexpected object), the number of complementary dropping operations may be reduced to fit the number of available transmission paths for the current communication link. Consequently, when a perturbed transmission path becomes available, this number may be incremented by 1.

In a first step 1000, the wireless communicating nodes 100 and 150 select a set of transmission paths defining their common communication link, for example among the transmission paths P0, P1, P2 or P3 shown in FIG. 1a. Conventional mechanisms to determine the available transmission paths between two communicating nodes and to select appropriate paths may be used to that end.

For the purposes of illustration, let it be considered that the transmission paths P1 and P2 are selected by the wireless transmitting station 100 and the wireless receiving station 150.

In a second step 1001, the wireless transmitting station 100 (which is the source of the video stream) splits each incoming uncompressed video frame into a plurality of uncompressed Macro Pixel Blocks. This splitting process is performed within the Protocol Adaptation Layer (PAL) 115 of that wireless transmitting station 100.

Next, in step 1002, the wireless transmitting station 100 generates, from each of the aforementioned uncompressed Macro Pixel Block, a pair of complementary Macro Pixel Blocks. Of course, these complementary Macro Pixel Blocks are built as discussed above, i.e. by applying complementary dropping profiles shown in FIGS. 8 and 9, in such a way the built Macro Pixel Blocks are complementary, i.e. mainly they make it possible to retrieve a 4:4:4 MPB when they are combined together.

In particular, a pair of complementary dropping profiles is first selected for the current MPB to process. The pixel information dropping profile may be defined either for the whole video frame or for a part of the frame. In the first case, the pair of dropping profiles has to be determined only when processing the first MPB of the video frame. In the second case, it may be periodically determined (e.g. for each MPB) or determined when a new event occurs.

For example it may be determined based on current network conditions (e.g. on the available channel bandwidth, i.e. the current rate to be achieved but not to be exceeded), in such a way the resulting data fit the available transmission path bandwidths. It is then possible to switch between dropping profiles when processing consecutive macro pixel blocks. The video rate is thus adapted in the course of processing a video frame, to react for example to a change of network conditions. This is particularly advantageous when streaming HD video contents.

Step 1020 results in two complementary video frames, each comprising one complementary MPB of each generated pair.

In step 1003, the wireless transmitting station 100 transmits the two resulting complementary video frames over respectively the selected transmission path P1 and the other selected transmission path P2. This means that the complementary MPBs of a given pair are transmitted over separate transmission paths to the wireless receiving station 150. It is the same at the pixel block level: one complementary pixel block of each pair is transmitted over a first transmission path P1 to the wireless receiving station and the other complementary pixel block of each pair is transmitted over a second separate transmission path P2 to the wireless receiving station.

In the last step 1004, the wireless receiving station 150 receives some video data from the wireless transmitting station 100, over one or more transmission paths. This means that the wireless receiving station 150 may receive all or part of the transmitted complementary Macro Pixel Blocks corresponding to each original MPB of a video frame, depending for example on interference or shadowing phenomena occurring on some of the transmission paths as discussed above. In particular, it may receive only one complementary MPB of a pair generated and transmitted by the wireless transmitting station 100.

The wireless receiving station 150 thus processes all the Macro Pixel Blocks received from the transmission paths selected at step 1000, by considering successively the received MPBs corresponding to a MPB to be reconstructed in the video frame.

In case only one out of the several transmitted complementary Macro Pixel Blocks generated from the same uncompressed Macro Pixel Block is received, the Protocol Adaptation Layer (PAL) 155 of the wireless receiving station 150 performs the interpolation processes described above with reference to FIG. 5 to retrieve the missing pixel information from the received complementary Macro Pixel Block. The resulting 4:4:4 Macro Pixel Block is then sent to the application layer 155 of the wireless receiving station 150 for final processing, such as decoding and video rendering.

In case at least two out of the several transmitted complementary Macro Pixel Blocks generated from the same uncompressed Macro Pixel Block are received, the Protocol Adaptation Layer (PAL) 155 of the wireless receiving station 150 combines said received complementary Macro pixel Blocks, as described above, to obtain a recovered Macro Pixel Block.

In case all the transmitted complementary Macro Pixel Blocks are received and are fully complementary, their combining makes it possible to recover the original 4:4:4 uncompressed Macro Pixel Block. It is then sent to the application layer 155 of the wireless receiving station 150 for final processing, such as decoding and video rendering.

Otherwise, some pixel information is missing from the recovered Macro Pixel Block. In case a colour component is missing, the Protocol Adaptation Layer (PAL) 155 of the wireless receiving station 150 may perform the interpolation processes described above with reference to FIG. 5 on said recovered Macro Pixel Block. In case only LSBs are missing from some colour components, the Protocol Adaptation Layer (PAL) 155 of the wireless receiving station 150 may pad the missing LSBs with '0' value bits or with a mean value information (e.g. in case 3 least significant bits were dropped, the mean padding value is "100"), so as to obtain only 8-bit colour component throughout the whole Macro Pixel Block. The resulting Macro Pixel Block is then sent to the application layer 155 of the wireless receiving station 150 for final processing, such as decoding and video rendering.

As described above, the present invention thus optimizes the use of the radio channel bandwidth for multi-path transmission, while keeping a high video rendering quality. In particular, the video rendering quality is kept high when it turns out that only one transmission path works, since the wireless receiving station may decode the video information regardless the transmission path over which the data are received. The multi-path transmission according to the invention thus appears to be robust to data or transmission path loss.

In addition, the dropping operations defined within the scope of the invention are of low complexity, thus resulting for the invention in a low complexity multi-path transmission scheme and for the wireless communicating stations in low hardware and memory resource requirements. Quality of service, including low latency transmission, can therefore be obtained.

A first embodiment of the present invention has been described above, wherein one or more colour components of pixels are dropped from PBs according to patterns of enhancement pixel information dropping operations defined by pixel enhancement information dropping profiles.

A second embodiment of the invention is now described with reference to FIG. 11, wherein the dropping operations drop enhancement part of the bits coding the pixel colour component, instead of the colour components themselves.

The same format of uncompressed video frame as above is used in this example, meaning that each pixel is made of three video components (e.g. Y, Cr and Cb), each coded over a fixed number of bits defining the various colour depths (e.g. 8 bits, 16 bits or 32 bits).

The conventional bit ordering defines a MSB (most significant bit) representing the highest order of bits and a LSB (least significant bit) representing the lowest order of bits. Between them, there are bits of intermediate orders.

The MSB is the most significant bit for the video rendering and the LSB the least significant one. If the MSB of a luma component is modified from 1 to 0, this modifies the luminance of the pixel by half the total range. For example, the corresponding pixel can switch from mid-luminance (mid-grey) to total black if the other bits are 0s. On the contrary, if the LSB is changed from 1 to 0, this modifies the luminance of only one step in the whole luminance scale (which comprises $2^8$ or $2^{16}$ or $2^{32}$ steps), i.e. a slight change in luminance.

In this context, the MSB can be considered as base colour component information, while the other seven LSBs can be seen as enhancement colour component information.

The approach of the second embodiment of the invention is based on this observation and consists in dropping a number of LSBs in some or all video components of the pixels. In particular, the base pixel information defining a pixel comprises or is made of at least one most significant bit (MSB) of at least one colour component and the enhancement pixel information comprises or is made of least significant bits (LSBs) of the at least one colour component, and the different enhancement pixel information dropping operations applied to the same pixel block drop different least significant bits of the at least one colour pixel component within the pixel block.

Symmetrically to the 4:4:4, 4:2:2 and 4:2:0 sub-sampling schemes defined above, three enhancement pixel information dropping operations may be defined based on dropping LSBs, corresponding to three resolutions.

An invariant dropping operation or non-dropping operation, denoted "0EB" (standing for "zero enhancement bit"), drops no LSB from a pixel component. It corresponds to a high resolution since the resulting pixels keeps the source resolution. The complementary low resolution dropping operation, denoted "AEB" (standing for "all enhancement bits") drop all the considered enhancement bits, e.g. the seven LSBs, from each component of the considered pixel block.

A medium resolution dropping operation, denoted "HEB1" (standing for "half enhancement bits-type 1"), drops half the considered enhancement bits from each component of a considered pixel block. The complementary low resolution dropping operation, denoted "HEB2" (standing for "half enhancement bits-type 2"), drops the other half of the considered enhancements bits from each component of the considered pixel block, FIG. 11 illustrates the medium resolution dropping operations, types 1 and 2, at a pixel level (thus the same approach is applied to the other three pixels of the considered pixel block).

Where the original uncompressed colour component is coded over eight bits ($a_0$ to $a_7$), the HEB1 dropping operation keeps the base pixel information (MSB $a_0$ for each colour component) and the LSB with even index (i.e. $a_2$, $a_4$, $a_6$ for each colour component). The HEB2 dropping operation keeps the base pixel information (MSB $a_0$ for each colour component) and the LSB with odd index (i.e. $a_1$, $a_3$, $a_5$, $a_7$ for each colour component).

While here the base information is only the MSB $a_0$, other sharing between the eight bits may be contemplated within the scope of this second embodiment of the invention, for example the base pixel information may comprise the first 4 bits (i.e. the four MSBs $a_0$ to $a_3$) of each colour component and the enhancement pixel information that are shared between HEB1 and HEB2 may comprise the last 4 bits (i.e. the four LSBs $a_4$ to $a_7$) of each colour component. In another variant, this number of base and enhancement bits per colour component may vary from one type of colour component to another type: the base information of a luma component may be the four MSBs, while the base information of the chroma components may be only the first MSB.

Of course, as for the above first embodiment of the invention, one skilled in the art may derive, from the above explanations, a large range of other intermediate dropping operations (or profiles) and their complementary dropping operations (or profiles), for example by modifying the bit sharing between base and enhancement pixel information and/or by modifying the bit sharing of LSBs between complementary dropping operations.

Figure 11:
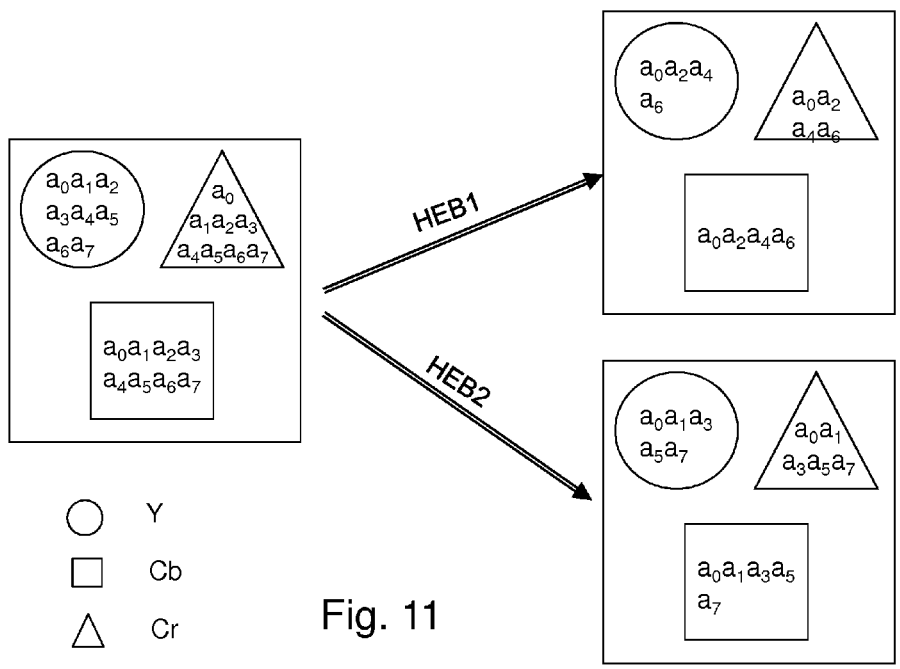
FIG. 11 illustrates a second embodiment of the invention.

The above explanation about the first embodiment of the invention may be applied to this LSB-based dropping approach of FIG. 11 to generate sets of complementary pixel blocks and to adapt the rate of a video frame to network conditions. In particular, dropping profiles made of a mosaic of 0EB and/or AEB and/or HEB may be provided. For example, the pairs of complementary dropping profiles of FIG. 9 may be used. The above adjacency scheme may also be used to provide efficient reconstruction at the receiver.

Regarding the reconstruction of the uncompressed video frame, the reconstruction module 170 can know the applied dropping profiles for each MPB or the applied dropping operations for each PB (given the above first embodiment) and then reconstruct the dropped LSBs of a pixel component by interpolating the corresponding LSBs of the adjacent pixels (of the adjacent pixel blocks), if these LSBs exist. When the adjacent pixels do not have the corresponding LSBs, a medium value may be used and padded.

Figure 12:
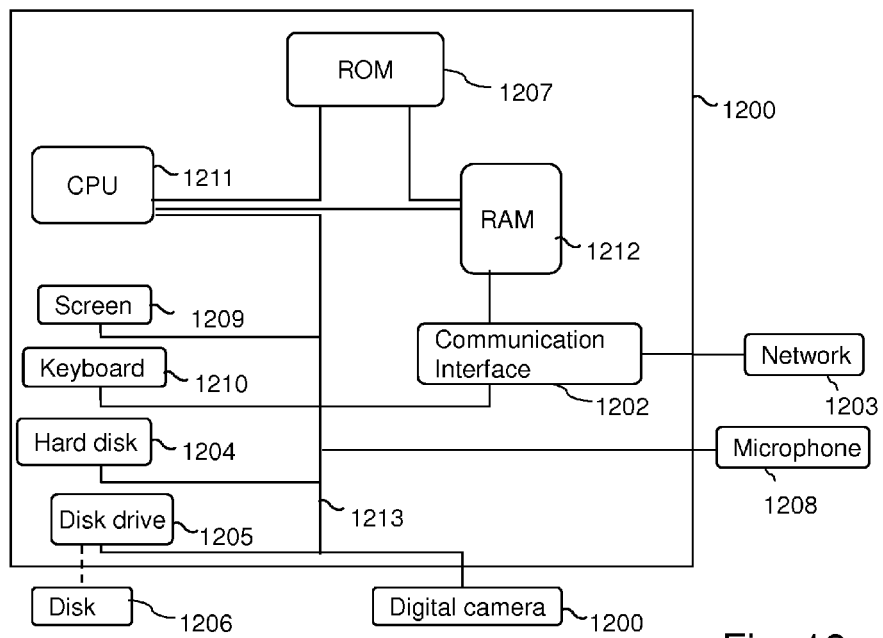
FIG. 12 is a block diagram illustrating components of a processing device in which embodiments of the invention may be implemented.

FIG. 12 schematically illustrates a processing device 1200, either a wireless transmitting station, or a wireless receiving station, or a station embedding both functionalities, configured to implement at least one embodiment of the present invention. The processing device 1200 may be a device such as a micro-computer, a workstation or a light portable device.

The device 1200 comprises a communication bus 1213 to which there are preferably connected:
- a central processing unit 1211, such as a microprocessor, denoted CPU;
- a read only memory 1207, denoted ROM, for storing computer programs for implementing the invention;
- a random access memory 1212, denoted RAM, for storing the executable code of the method of embodiments of the invention as well as the registers adapted to record variables and parameters necessary for implementing methods according to embodiments of the invention; and
- a communication interface 1202 connected to a communications network 1203 over which digital data to be processed are transmitted, for example a wireless communication network.

Optionally, the apparatus 1200 may also include the following components:
- a data storage means 1204 such as a hard disk, for storing computer programs for implementing methods of one or more embodiments of the invention and data used or produced during the implementation of one or more embodiments of the invention;
- a disk drive 1205 for a disk 1206, the disk drive being adapted to read data from the disk 1206 or to write data onto said disk;
- a screen 1209 for displaying data and/or serving as a graphical interface with the user, by means of a keyboard 1210 or any other pointing means.

The apparatus 1200 can be connected to various peripherals, such as for example a digital camera 1200 or a microphone 1208, each being connected to an input/output card (not shown) so as to supply multimedia data to the apparatus 1200.

The communication bus provides communication and interoperability between the various elements included in the apparatus 1200 or connected to it. The representation of the bus is not limiting and in particular the central processing unit is operable to communicate instructions to any element of the apparatus 1200 directly or by means of another element of the apparatus 1200.

The disk 1206 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 1207, on the hard disk 1204 or on a removable digital medium such as for example a disk 1206 as described previously. According to a variant, the executable code of the programs can be received by means of the communication network 1203, via the interface 1202, in order to be stored in one of the storage means of the apparatus 1200, such as the hard disk 1204, before being executed.

The central processing unit 1211 is adapted to control and direct the execution of the instructions or portions of software code of the program or programs according to the invention, which instructions are stored in one of the aforementioned storage means. On powering up, the program or programs that are stored in a non-volatile memory, for example on the hard disk 1204 or in the read only memory 1207, are transferred into the random access memory 1212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of transmitting video information over a wireless communication link made of several transmission paths between a wireless transmitting station and a wireless receiving station, the method comprising, in the wireless transmitting station:
   obtaining an uncompressed video frame made of an array of pixel blocks, a pixel in the array of pixel blocks being represented by base pixel information and enhancement pixel information;
   generating at least one set of complementary pixel blocks from a given pixel block of the obtained uncompressed video frame, by applying different operations to said given pixel block for dropping different enhancement pixel information from the given pixel block, so that the at least one set of complementary pixel blocks comprise different enhancement pixel information and each of the at least one set of complementary pixel blocks comprises the base pixel information; and
   for each of the at least one set of complementary pixel blocks, transmitting the complementary pixel blocks over respective different transmission paths to the wireless receiving station.

2. The transmitting method of claim 1, wherein the different enhancement pixel information dropping operations applied to a given pixel block are defined so that a combination of the resulting complementary pixel blocks provides all the pixel information of said given pixel block.

3. The transmitting method of claim 1, wherein each generated set is a pair of generated complementary pixel blocks, and
   said transmitting comprising transmitting one complementary pixel block of each pair over a first transmission path to the wireless receiving device and the other complementary pixel block of each pair over a second separate transmission path to the wireless receiving device.

4. The transmitting method of claim 1, wherein at least two sets of complementary pixel blocks are generated from respective pixel blocks of the obtained uncompressed video frame, and the complementary pixel blocks from the two sets which are transmitted over the same transmission path are generated by applying two different enhancement pixel information dropping operations.

5. The transmitting method of claim 1, further comprising selecting the different enhancement pixel information dropping operations to apply based on one or more network conditions of the wireless communication link.

6. The transmitting method of claim 1, wherein the pixel information defining a pixel comprises a base colour component and at least one enhancement colour component, and an enhancement pixel information dropping operation applied to a given pixel block drops an enhancement colour component of at least one pixel of that given pixel block.

7. The transmitting method of claim 6, wherein the base colour component is a luma component and the dropped colour component is a chroma component, in a luma-chroma based colour space.

8. The transmitting method of claim 6, wherein the different pixel information dropping operations applied to the same four-pixel block comprise:
   a sub-sampling operation applied to the four-pixel block according to a 4:2:2 scheme that drops the chroma colour components from two out of the four pixels, and a sub-sampling operation applied to the four-pixel block according to a 4:2:2 scheme that drops the chroma colour components from the other two pixels; or
   a sub-sampling operation applied to the four-pixel block according to a 4:2:0 or 4:1:1 scheme that drops chroma colour components from all the four pixels, and a sampling operation applied to the four-pixel block according to a 4:4:4 scheme that keeps all the colour components of the pixel block.

9. The transmitting method of claim 6, wherein the pixel information defining a pixel comprises colour components coded over a fixed number of bits, and the different enhancement pixel information dropping operations applied to the same pixel block further drop least significant bits of colour pixel components within the pixel block.

10. The transmitting method of claim 9, wherein the different enhancement pixel information dropping operations applied to the same pixel block drop the least significant bits of different pixel colour components within the pixel block.

11. The transmitting method of claim 10, further comprising applying to the complementary pixel blocks respective least-significant-bit dropping operations that are complementary, so that a combination of the resulting complementary pixel blocks provides the original least significant bits of all pixels within the pixel block.

12. The transmitting method of claim 1, wherein the base pixel information defining a pixel is made of at least one most significant bit of at least one colour component and the enhancement pixel information is made of at least significant bits of the at least one colour component, and the different enhancement pixel information dropping operations applied to the same pixel block drop different least significant bits of the at least one colour pixel component within the pixel block.

13. The transmitting method of claim 1, wherein the enhancement pixel information dropping operations applied to a plurality of pixel blocks to generate the complementary pixel blocks to be transmitted over the same transmission path are defined in a pixel information dropping profile selected from a first set of predetermined dropping profiles.

14. The transmitting method of claim 1, further comprising applying an enhancement pixel information dropping operation to a given pixel block to obtain a complementary pixel block to be transmitted over a transmission path; and applying, to at least one adjacent pixel block adjacent to the given pixel block, an enhancement pixel information dropping operation that keeps more enhancement pixel information than the enhancement pixel information dropping operation applied to the given pixel block, to obtain an adjacent complementary pixel block to be transmitted over the same transmission path.

15. The transmitting method of claim 1, wherein further comprising, in the wireless receiving station:
- receiving the transmitted pixel blocks over different transmission paths; and
- combining the received pixel blocks to generate a reconstructed pixel block which is enhanced compared to each of the received pixel blocks.

16. The transmitting method of claim 15, wherein combining the received pixel blocks generates an enhanced pixel block having all the pixel information of the corresponding pixel block within the uncompressed video frame.

17. A non-transitory computer-readable storage medium storing instructions of a computer program for carrying out the method according to claim 1.

18. The transmitting method of claim 1, wherein the array of pixel blocks comprises a first pixel block and a second pixel block different from the first pixel block, and the step of generating comprises:
- generating a first set of complementary pixel blocks from said first pixel block, by applying a first set of different operations to said first pixel block for dropping different enhancement pixel information from said first pixel block, so that the first set of complementary pixel blocks comprise different enhancement pixel information and each of the first set of complementary pixel blocks comprises the base pixel information; and
- generating a second set of complementary pixel blocks from said second pixel block, by applying a second set of different operations to said second pixel block for dropping different enhancement pixel information from said second pixel block, so that the second set of complementary pixel blocks comprise different enhancement pixel information and each of the second set of complementary pixel blocks comprises the base pixel information; and
- wherein the first set of different operations applied to the first pixel block is different from the second set of different operations applied to the second pixel block.

19. A wireless transmitting station for transmitting video information to a wireless receiving station over a wireless communication link made of several transmission paths, the wireless transmitting station comprising:
- an obtaining means for obtaining an uncompressed video frame made of an array of pixel blocks, a pixel in the array of pixel blocks being represented by base pixel information and enhancement pixel information;
- a complementary pixel block generator for generating at least one set of complementary pixel blocks from a given pixel block of the obtained uncompressed video frame, by applying different operations to said given pixel block for dropping different enhancement pixel information from that the given pixel block, so that the at least one set of complementary pixel blocks comprise different enhancement pixel information and each of the at least one set of complementary pixel blocks comprises the base pixel information; and
- a communication module for transmitting, for each of the at least one set of complementary pixel blocks, the complementary pixel blocks over respective different transmission paths to the wireless receiving station.

* * * * *